United States Patent
Yamamoto et al.

(10) Patent No.: US 7,664,598 B2
(45) Date of Patent: Feb. 16, 2010

(54) GUIDING DEVICE AND GUIDING METHOD

(75) Inventors: Kakuya Yamamoto, Hyogo (JP); Keiji Sugiyama, Kyoto (JP); Junichi Hirai, Osaka (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 10/593,722

(22) PCT Filed: Jan. 25, 2006

(86) PCT No.: PCT/JP2006/301135
§ 371 (c)(1),
(2), (4) Date: Sep. 21, 2006

(87) PCT Pub. No.: WO2006/080344
PCT Pub. Date: Aug. 3, 2006

(65) Prior Publication Data
US 2008/0243385 A1    Oct. 2, 2008

(30) Foreign Application Priority Data
Jan. 26, 2005 (JP) ............................ 2005-018268

(51) Int. Cl.
*G01C 21/28* (2006.01)
*G06F 19/00* (2006.01)
(52) U.S. Cl. .................. 701/210; 701/207; 701/300; 340/995.22
(58) Field of Classification Search ............... 701/210, 701/207, 300, 301; 240/435, 995.22, 995.23, 240/995.24
See application file for complete search history.

(56) References Cited

U.S. PATENT DOCUMENTS 6,091,956 A * 7/2000 Hollenberg .............. 455/456.5

(Continued)

FOREIGN PATENT DOCUMENTS

EP    1 486 759    12/2004

(Continued)

OTHER PUBLICATIONS

English Translation of paragraphs [0015]—[0030], [0035]—[0045], and Figs. 1 and 3 of Japanese Unexamined Patent Application Publication No. 2002-257581, published on Sep. 11, 2002.

*Primary Examiner*—Tan Q Nguyen
(74) *Attorney, Agent, or Firm*—Wenderoth, Lind & Ponack, L.L.P.

(57) ABSTRACT

The present invention provides a guiding device that can induce a user to move according to a guiding route.

The guiding device according to the present invention is a guiding device which guides a user, including an acquisition unit (101) which acquires a guiding route for the user, a recognition unit (102) which recognizes an object which exists in the user's vicinity, a management unit (104) which manages an object and an adjustment method for adjusting an influence that the object has on the movement of the user, by associating the object and the adjustment method in advance, a judgment unit (103) which judges whether or not the object recognized by the recognition unit (102) exists within the guiding route acquired by the acquisition unit (101), and an adjustment unit (110) which executes a specified adjustment process based on the judgment made by the judgment unit (102), and on the adjustment method managed in association with the object recognized by the recognition unit (102).

14 Claims, 23 Drawing Sheets

U.S. PATENT DOCUMENTS

| | | |
|---|---|---|
| 6,526,351 B2 * | 2/2003 | Whitham .................... 701/211 |
| 7,072,766 B2 * | 7/2006 | Kato et al. .................. 701/211 |
| 7,130,742 B2 * | 10/2006 | Kobuya et al. .............. 701/207 |
| 2004/0260459 A1 | 12/2004 | Kato et al. |
| 2005/0071082 A1 * | 3/2005 | Ohmura et al. ............. 701/211 |

FOREIGN PATENT DOCUMENTS

| | | |
|---|---|---|
| JP | 2001-100678 | 4/2001 |
| JP | 2002-253688 | 9/2002 |
| JP | 2002-257581 | 9/2002 |
| JP | 2003-279373 | 10/2003 |
| JP | 2004-347459 | 12/2004 |
| JP | 2005-37181 | 2/2005 |

* cited by examiner

FIG. 6
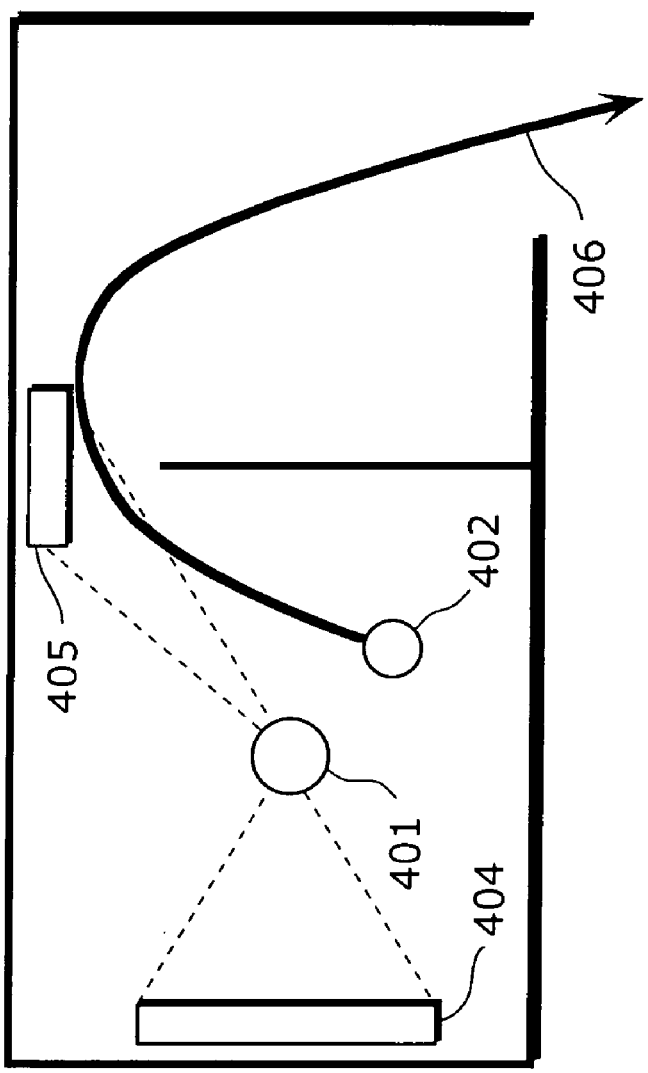
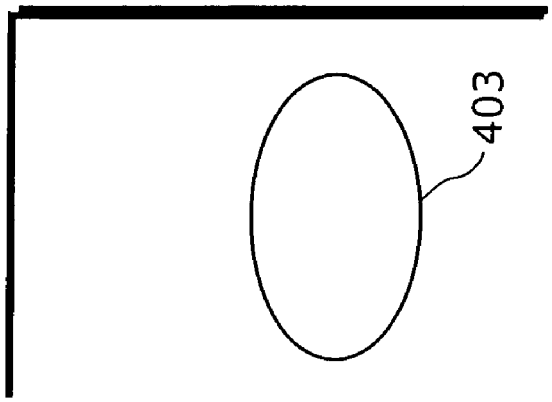

FIG. 7
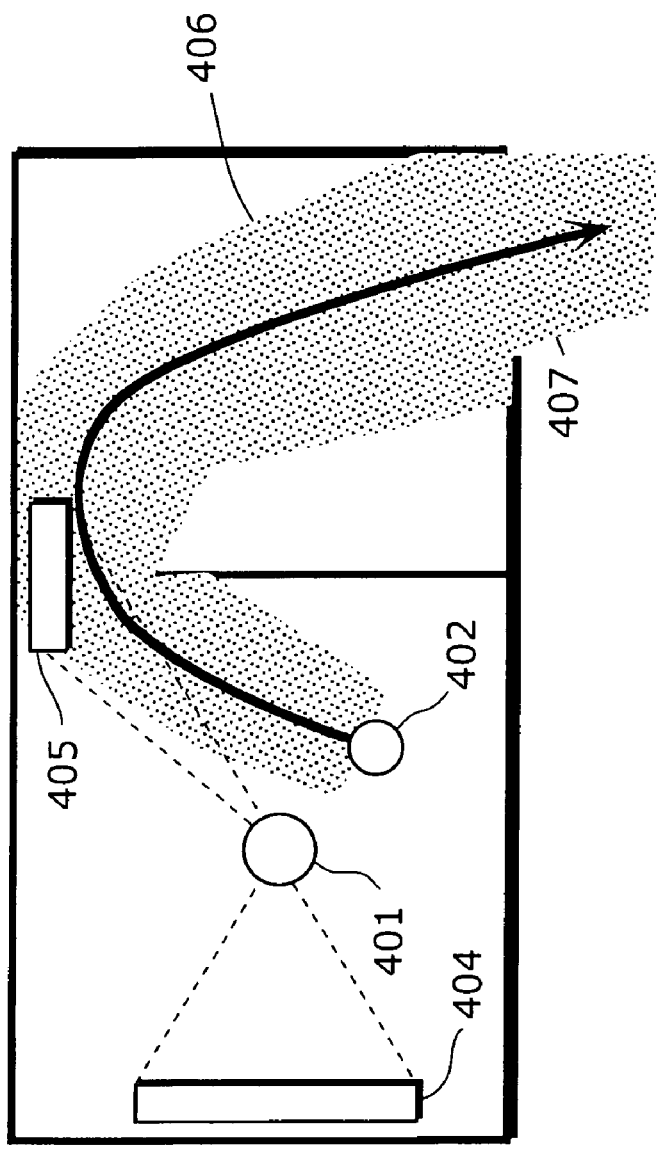
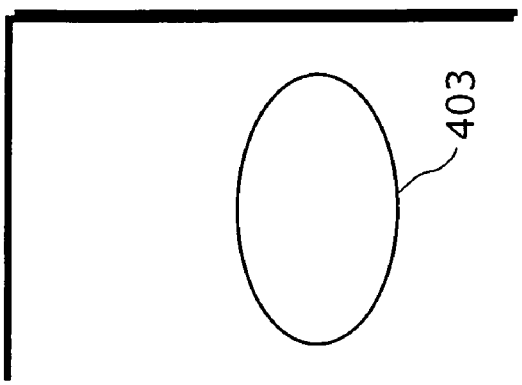

FIG. 8

| Attraction Name | Adjustment Orientation | Target | Adjustment Condition | Example |
|---|---|---|---|---|
| Real cat | Augment attraction | Cat | A cat is present | (Omitted) |
| Cat image 1 | Augment attraction | Wall | An image may be projected onto a visible wall | 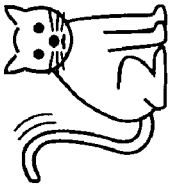 |
| Cat hiss | Reduce attraction | Cat | Audio reproduction may be performed so that the audio sounds as if it originates from the direction of a cat | "Hiss" |
| --- | --- | --- | --- | --- |

FIG. 9
| Resistance Name | Adjustment Orientation | Target | Adjustment Condition | Example |
|---|---|---|---|---|
| Real dog | Augment resistance | Dog | A large dog is present |  |
| Image of a devil | Augment resistance | Wall | An image may be projected onto a visible wall |  |
| Image of a child playing with a dog | Reduce resistance | Dog, Wall | A dog is present, and thus an image may be projected onto a wall near the dog |  |
| --- | --- | --- | --- | --- |
L2

| Talent | Number of Displays | Number of Selections | Number of Interruptions |
|---|---|---|---|
| AA Hanako | 10 | 9 | 0 |
| BB Tarou | 10 | 0 | 0 |
| CC Jirou | 7 | 1 | 0 |
| DD Saburou | 3 | 1 | 1 |
| ⋮ | ⋮ | ⋮ | ⋮ |

FIG. 12

| Attraction Name | Adjustment Orientation | Target | Adjustment Condition | Example |
|---|---|---|---|---|
| Real cat | Augment attraction | Cat | A cat is present | (Omitted) |
| Cat image 1 | Augment attraction | Wall | An image may be projected onto a visible wall |  |
| Cat hiss | Reduce attraction | Cat | Audio reproduction may be performed so that the audio sounds as if it originates from the direction of a cat | "Hiss" |
| Image of AA Hanako | Augment attraction | Wall | An image may be projected onto a visible wall | 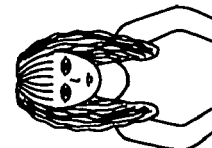 |
| Sparrow call | Augment attraction | Sparrow | Audio reproduction may be performed so that the audio sounds as if it originates from the direction of a sparrow | "Tweet tweet" |
| --- | --- | --- | --- | --- |

FIG. 13

| Resistance Name | Adjustment Orientation | Target | Adjustment Condition | Example |
|---|---|---|---|---|
| Real dog | Augment resistance | Dog | A large dog is present |  |
| Image of a devil | Augment resistance | Wall | An image may be projected onto a visible wall |  |
| Image of a child playing with a dog | Reduce resistance | Dog, Wall | A dog is present, and thus an image may be projected onto a wall near the dog |  |
| Image of BB Tarou | Augment resistance | Wall | An image may be projected onto a visible wall |  |
| Frog sound | Augment resistance | Frog | Audio reproduction may be performed so that the audio sounds as if it originates from the direction of a frog | "Ribbit ribbit" |
| --- | --- | --- | --- | --- |

| Animal | Number of Appearances | Number of Approaches | Number of Evasions |
|---|---|---|---|
| Sparrow | 5 | 5 | 0 |
| Frog | 3 | 0 | 0 |
| Rabbit | 2 | 1 | 0 |
| Cockroach | 4 | 3 | 1 |
| ⋮ | ⋮ | ⋮ | ⋮ |

FIG. 18
| Attraction Name | Adjustment Orientation | Target | Adjustment Condition | Example |
|---|---|---|---|---|
| Real cake | Augment attraction | Cake | A real cake is present |  |
| Cat image 2 | Augment attraction | Wall, Ground | May be presented in a see-through HMD |  |
| Collection of ordinary objects | Reduce attraction | General | May be presented in a see-through model HMD near an attractor | 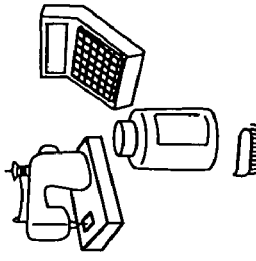 |
| --- | --- | --- | --- | --- |
L3

GUIDING DEVICE AND GUIDING METHOD

TECHNICAL FIELD

The present invention relates to a guiding device and a guiding method for guiding a user.

BACKGROUND ART

Presently, there are devices which guide a user to a destination.

There is for instance a device which indicates a guiding direction using audio, based on the orientation of a pedestrian's body (see for example, Patent Document 1). With this device, it is possible to reduce problems in which a pedestrian mistakes a movement direction by providing guidance for pedestrians according to audio guidance.

There is also a device for disaster guidance, which flashes disaster guidance lighting based on a disaster signal (see for example, Patent Document 2). With this device, it is possible to reduce problems in which movement direction is mistaken by carrying out evacuation according to a flashing state in the disaster guidance lighting.

[Patent Document 1] Japanese Laid-Open Patent Application No. 2002-257581 Publication

[Patent Document 2] Japanese Laid-Open Patent Application No. 2002-253688 Publication

DISCLOSURE OF INVENTION

Problems that Invention is to Solve

However, even if the guiding information is correct and easily understood by the user, there is the problem that when the user does not obey the guidance, the device is unable to guide the user. In other words, for a user who is focused on the movement direction and heeds the guidance presented, the conventional methods will have a significant effect; however, for children, pets and other users who will most likely not follow guidance, as well as for users who are distracted by phenomena other than movement, the conventional methods will be unable to guide the user according to the guiding route.

The present invention is conceived to solve the aforementioned problems and has as an object to provide a guiding device and guiding method which can induce a user to move according to a guiding route.

Means to Solve the Problems

In order to achieve the object above, the guiding device in the present invention is a guiding device which guides a user, the guiding device including: an acquisition unit which acquires a guiding route for the user; a recognition unit which recognizes an object which exists in the vicinity of the user; a management unit which manages an object and an adjustment method for adjusting an influence that the object has on a action of the user, by associating the object and the adjustment method in advance; a judgment unit which judges whether or not the object recognized by the recognition unit exists within the guiding route acquired by the acquisition unit; and an adjustment unit which executes a specified adjustment process based on a result obtained by the judgment unit, and on the adjustment method managed in association with the object recognized by the recognition unit. With this, the mental state of the user is adjusted and the user is induced to move according to the guiding route. There is also the effect that feelings of discomfort will be reduced since the user can be made to think that he or she has moved autonomously.

Specifically, the adjustment unit may augment an extent to which the object attracts the user, in the case where the object is judged to exist within the guiding route. Thus it becomes possible to augment the extent to which the user feels like moving according to the guiding route.

Also, the adjustment unit may reduce an extent to which the user shows resistance to the object, in the case where the object is judged to exist within the guiding route. Thus it becomes possible to reduce the extent to which the user does not feel like moving according to the guiding route.

Also, the adjustment unit may reduce an extent to which the object attracts the user, in the case where the object is judged not to exist within the guiding route. Thus it becomes possible to reduce the extent to which the user feels like moving outside of the guiding route.

Also, the adjustment unit may augment an extent to which the user shows resistance to the object, in the case where the object is judged to not exist within the guiding route. Thus it becomes possible to augment the extent to which the user does not feel like moving outside of the guiding route.

Here, the adjustment unit may be a head mounted display which presents a specified image to the user in such a way as to make the specified image overlap the object, or as if the specified image exists in an area around the object. Thus it becomes possible to induce the user, fitted with a head mounted display, to move according to the guiding route.

Also, the adjustment unit may be a head mounted display which presents a specified audio to the user so that the specified audio is audible from the direction of the object. Thus it becomes possible to induce the user, fitted with a head mounted display, to move according to the guiding route.

Also, the adjustment unit may be a projector which projects an image onto the object. Thus it becomes possible to induce the user, in the area which can be projected to by the projector, to move according to the guiding route.

Also, the adjustment unit may be an air-conditioning device which makes the object conduct an air flow. Thus it becomes possible to induce the user, in the area to which air can be conducted by a fan controlled by the air-conditioning device, to move according to the guiding route.

Here, the management unit manages one of an attraction list which is a collection of phenomena that influence an extent to which the user is attracted, and a resistance list which is a collection of phenomena which influence the extent to which the user shows resistance; and the adjustment unit may cause a phenomenon included in one of the attraction list and the resistance list to occur. Thus, an appropriate phenomenon is selected from the attraction list or the resistance list, and it becomes possible to adjust the mental state of the user by an appropriate adjustment method utilizing this phenomenon.

Also, the guiding device further includes a history accumulation unit which accumulates an action history of the user, and the management unit may update contents of one of the attraction list and the resistance list to contents reflecting a preference of the user, based on the action history of the user accumulated in the history accumulation unit. Thus it becomes possible to improve the probability that the guidance will succeed.

Note that the present invention can be realized not only as the guiding device above but also as a guiding method which includes the characteristic units included in the guiding device as steps, and as a program which causes a computer to execute these steps. It goes without saying that this sort of program could be distributed through a recording medium such as a CD-ROM and a transmission medium such as the Internet.

Also, the function blocks in FIG. 2 or FIG. 3 are realized typically as an LSI, which is an integrated circuit. Each of these parts can be in plural single-function LSIs, or also can be in one integrated LSI. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows reconfiguration of the connection or configuration of LSI may be used for the same purpose.

In the future, with advancement in manufacturing technology, a brand-new technology may replace LSI. The integration can be carried out by that technology. Application of biotechnology is one such possibility.

Effects of the Invention

As a result of the augmentation of attraction and the decrease of resistance to the area inside the guiding route, and the decrease of attraction and the augmentation of resistance to the area outside the guiding route, it becomes possible to induce a user to move according to the guiding route, with the guiding device above in the present invention. There is also the effect that feelings of discomfort will be reduced since the user can be made to think that he or she has moved autonomously.

BRIEF DESCRIPTION OF DRAWINGS

FIG. 6 is a diagram which shows an example of a guiding route in the first embodiment of the present invention.

FIG. 7 is a diagram which shows an example of route-interior area in the first embodiment of the present invention.

FIG. 8 is a diagram which shows an example of an attraction list in the first embodiment of the present invention.

FIG. 9 is a diagram which shows an example of a resistance list in the first embodiment of the present invention.

FIG. 11 is a diagram which shows the user's action history in the first embodiment of the present invention.

FIG. 12 is a diagram which shows an example of another attraction list in the first embodiment of the present invention.

FIG. 13 is a diagram which shows an example of another resistance list in the first embodiment of the present invention.

FIG. 18 is a diagram which shows the attraction list in the second embodiment of the present invention.

NUMERICAL REFERENCES

Figure 1:
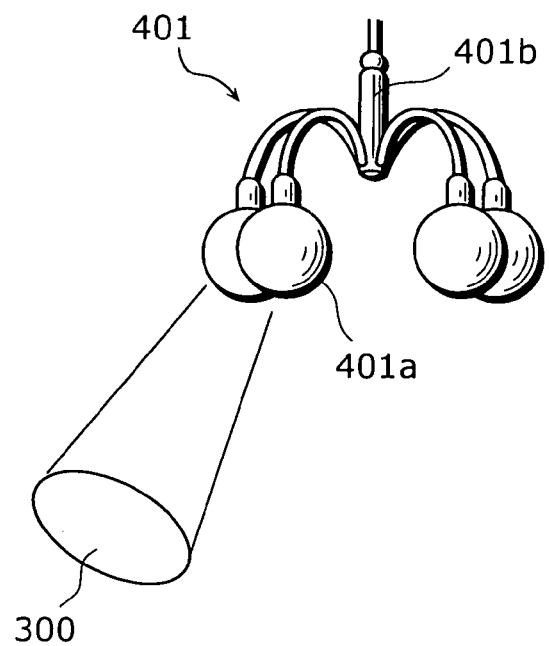
FIG. 1 is a schematic outline drawing of the guiding device in the first embodiment of the present invention.

101 Acquisition unit
102 Recognition unit
103 Judgment unit
104 Management unit
110 Adjustment unit
111 Route-interior area adjustment unit
112 Route-exterior area adjustment unit
113 Attraction amplification unit
114 Resistance reduction unit
115 Attraction reduction unit
116 Resistance augmentation unit
117 Attraction list management unit
118 Resistance list management unit
401 Projector-installed lighting apparatus
402 Infant
403 Neighboring house fire
404 Wall face
405 Wall face
406 Guiding route
407 Route-interior area

BEST MODE FOR CARRYING OUT THE INVENTION

Below, the embodiments of the present invention are described in detail using diagrams.

First Embodiment

FIG. 1 is a schematic outline drawing of the guiding device in the first embodiment of the present invention. The guiding device 401 is specifically a lighting apparatus installed with a projector 401a, which projects an image 300, and includes a communication unit 401b for communicating with a cellular phone and the like not shown in the drawing.

Figure 2:
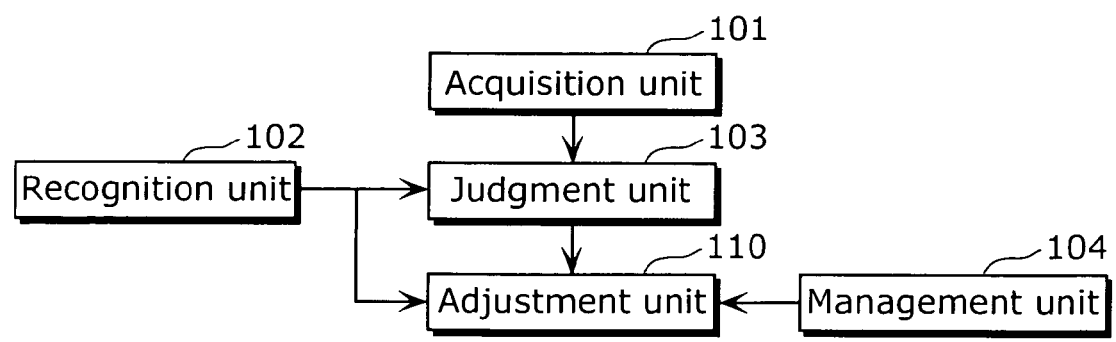
FIG. 2 is a schematic block diagram of the guiding device in the first embodiment of the present invention.

FIG. 2 is a schematic functional block diagram of the guiding device in the first embodiment of the present invention. The guiding device functionally includes an acquisition unit 101, a recognition unit 102, a judgment unit 103, a management unit 104 and an adjustment unit 110.

The acquisition unit 101 acquires a user's guiding route information. The user may be any subject which has his/her action guided by the guiding device, including infants and pets such as dogs and cats. The user may be singular or plural. In addition, the subject who sets a guiding objective, such as a destination, may be a user or a subject other than the user such as the user's parent. The guiding route information is information relating to the position and movement of the user's body, and may be walking route information for the user, movement route information for a vehicle which the user rides in, as well as operation route information and operation procedure information concerning a part of the user's body, like the movement of the user's arm, finger or line of sight, or the user's voice. The guiding route may be strictly prescribed by position and action at a specific time, by area and range in order to show an outline of positions and actions, and by a prescription method such as one which prescribes the guiding route according to the probability that "the user will turn right at a particular intersection with a 50% probability".

With regards to the acquisition of guiding route information, it may be acquired from any kind of guiding route providing means such as a car navigation system, a cellular phone navigation system for pedestrians and the like, as well as from a plurality of guiding route providing means. Information related to the user such as the user's identifier, personal information and vicinity situation may be transmitted and received between the guiding device and the means for guiding route provision, when the guiding route information is acquired, or before and after the acquisition. The acquisition of the guiding route information may be performed through a network such as in wireless communications, or through a recording medium such as a semi-conductor memory.

The recognition unit 102 recognizes the user's vicinity situation. The user's vicinity situation is a collection of information which characterizes locations in the user's vicinity while guiding the user. For example, the user's vicinity situations include: the user's location and present time, an action situation such as sitting, walking, walking speed, walking direction and watching television, a body situation such as line of sight direction, hand location, body heat and perspiration, images visible and sounds audible from the user, images shot and audio recorded in the user's surroundings, the existence of things and people in the user's vicinity and their attributes, phenomena occurring in the user's vicinity such as commodity sales, and a neighboring house fire, equipment that the user is wearing or carrying, such as an HMD (Head Mounted Display) and headphones and the state and attributes of that equipment, as well as a meteorological situation such as temperature, sunshine and rain. Further, a past vicinity situation and another person's vicinity situation may be included.

Recognizing the user's vicinity situation means that information related to the user's vicinity situation is acquired, and information concerning the user is extracted from the information related to the user's vicinity situation. The present guiding device may be set to recognize the user's vicinity situation according to information recognized by another, external device, and acquired by the recognition unit 102. The recognition unit 102 may include a GPS (Global Positioning System), a camera, or any kind of sensor such as an acceleration sensor, an inclination sensor or an electronic tag sensor, and may include a communication unit, which acquires information from a server on the internet, a camera and the like.

The judgment unit 103 judges whether or not an object recognized by the recognition unit 102 exists within the guiding route. Of course, since the recognition unit 102 does not recognize objects only, but also things not included in the word "object" such as the present time and the user's walking speed, the judgment unit 103 may be set to perform a judgment process in consideration of this kind of non-object information.

As described above, the guiding route may be prescribed by area and range. Accordingly, in the descriptions below, there are cases where a guiding route prescribed by area is referred to as a "route area". A route area is in other words an area in which the range of the user's future actions while being guided is shown. The range is prescribed so that action following the guidance is action inside the guiding range, and action not following the guidance is in turn action outside the guiding range. This range can be displayed as a route area on a map in the case where the user's action is walking movement.

The management unit 104 manages phenomena which influence the user's actions.

Phenomena which influence the user's actions are things that the user likes, things that the user dislikes, things that the user has an interest in, things that concern the user, things that the user fears, things that make the user uncomfortable and so on. The user may desire or avoid these phenomena themselves as well as information relating to these phenomena. Information about these phenomena is referred to below as management information. Information that indicates the strength of influence on the user, and information that indicates a method to change the strength may be included in the management information. The management information may be shared between a plurality of users, may be held per user or by a combination of these two methods. The management information may be changed according to the user's vicinity situation and the user's actions, and may be changed using another person's management information as well as past management information.

The adjustment unit 110 executes a specified adjustment process based on a judgment made by the judgment unit 103, and on an adjustment method managed in association with an object recognized by the recognition unit 102. To put it another way, the adjustment unit 110 adjusts the user's vicinity area using the judgments from the judgment unit 103, the management information of the management unit 104 and the recognition results from the recognition unit 102. ". . . adjusts the user's vicinity area . . ." means e.g. that the adjustment unit 110 adjusts the influence that an object which exists in the user's vicinity has on the user's actions. The method for adjustment may be a method that directly changes the user's vicinity situation, by changing the direction, temperature or strength of an air stream conducted from an electric fan with an air conditioning system, and a method that changes the user's mental state regarding vicinity situation by music reproduction or image presentation in an HMD, without the user's vicinity situation directly changing. If possible, the user's mental state should be changed to follow the guiding route more easily. The present guiding device sends out an adjustment instruction to another external device or an external system, which may be a method for the external device or the external system to adjust the user's vicinity situation.

Figure 3:
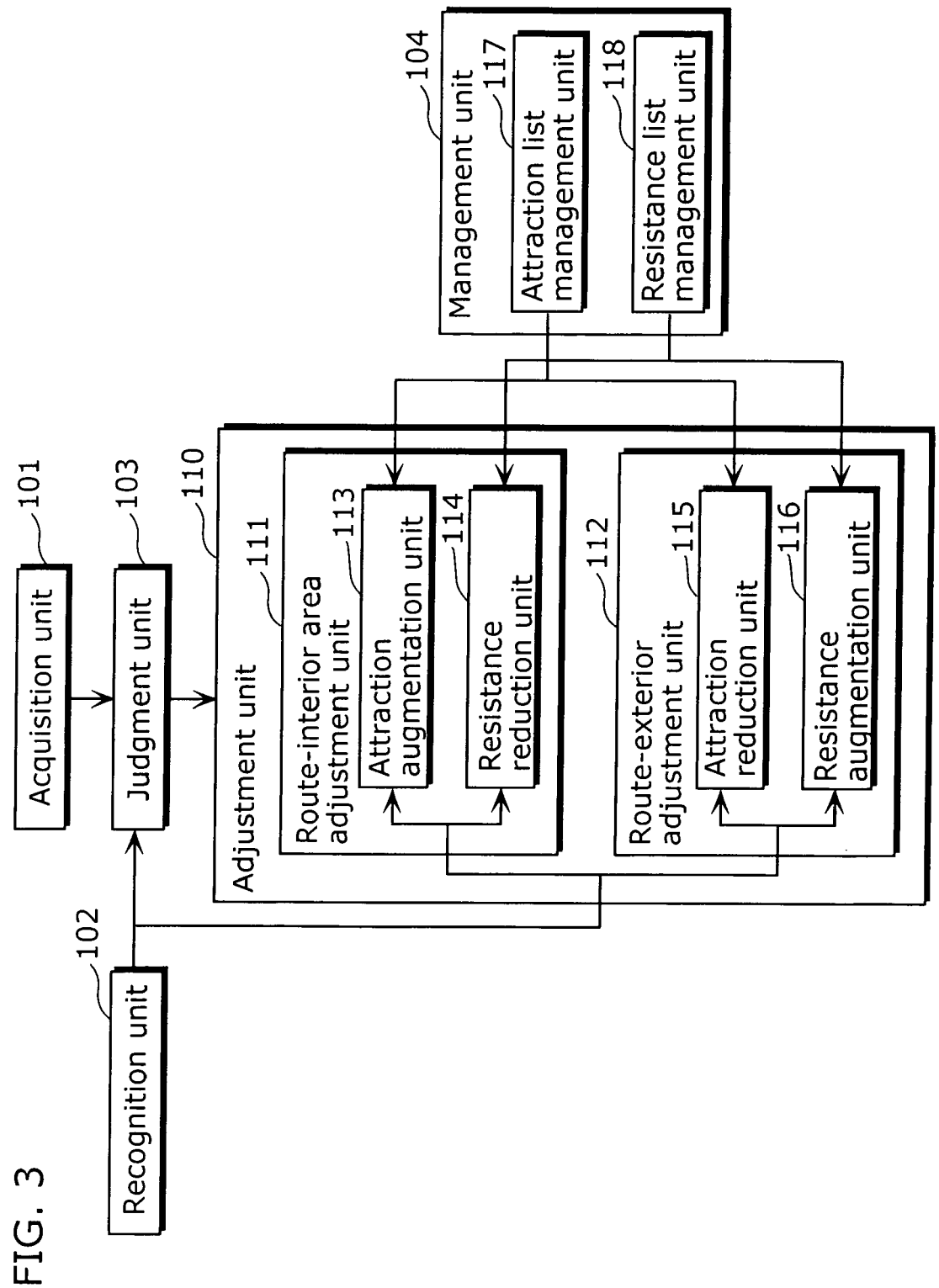
FIG. 3 is a detailed functional block diagram of the guiding device in the first embodiment of the present invention.

FIG. 3 is a detailed functional block diagram of the guiding device in the first embodiment of the present invention.

A route-interior area adjustment unit 111, which is included in the adjustment unit 110 above, adjusts the vicinity area judged by the judgment unit 103 as interior to the route area. A route-exterior area adjustment unit 112, which is included in the adjustment unit 110, adjusts a vicinity area judged by the judgment unit 103 as outside of the route area.

An attraction list management unit 117 is included in the management unit 104 above and manages phenomena that influence the degree to which the user is attracted (below, "attraction phenomena") in list format. Attraction phenomena are things that the user likes, things that the user has an interest in, things that concern the user, and the like. Attraction phenomena are characterized by the fact that the user desires not only the attraction phenomena themselves, but also information relating to the attraction phenomena. The list above is a list which shows things, persons and information which are interpreted as attraction phenomena and the characteristics of those things, persons, information and so on; below, the list is referred to as an attraction list. This attraction list may include information that indicates the strength of attraction, or information that indicates a method for changing the attraction strength. Also, the attraction list may be shared by a plurality of users, held by each user, or may be a combination of the two methods. The attraction list may be changed according to the user's vicinity situation and the user's action, and may be changed utilizing another person's attraction list or a past attraction list. In this attraction list, not just phenomena that augment the user's degree of attraction, but also phenomena that reduce the user's degree of attraction may be included.

A resistance list management unit 118 is included in the management unit 104 and manages phenomena that influence the degree to which the user shows resistance (below, "resistance phenomena") in list format. Resistance phenomena are things that the user dislikes, things that the user fears, things that make the user uncomfortable and so on. These resistance phenomena have the characteristic that the user will avoid not only the resistance phenomena themselves, but also information relating to the resistance phenomena. The list is a list which shows things, persons and information interpreted as resistance phenomena, the characteristics of those things, persons, and information and so on; below, the list is referred to as a resistance list. In this resistance list, information that shows the strength of resistance, and information which indicates a method of changing the strength of resistance may be included. Also, the resistance list may be shared by a plurality of users, held by each user, or may be a combination of both methods. The resistance list may be changed according to the user's vicinity situation and the user's action, and may be changed utilizing another person's resistance list or a past resistance list. In this resistance list, not just phenomena that augment the degree to which the user demonstrates resistance, but also phenomena that reduce the user's degree of attraction may be included.

An attraction augmentation unit 113 is included in the route-interior area adjustment unit 111, and augments the attraction of the area interior to the route by referencing the attraction list that the attraction list management unit 117 manages. In order to augment attraction, images of attractors that are not present may be shown in the HMD, and attractors which are present may be emphasized by for example outlining the area around actual attractors and displaying the attractors in a see-through HMD and so on.

A resistance reduction unit 114 is included in the route-interior area adjustment unit 111 above and reduces resistance in the area interior to the route by referencing the resistance list, managed by the resistance list management unit 118. In order to reduce resistance, the user's perception may be interfered with, and the user caused to misunderstand by for example hiding resistors which are present in the HMD, displaying another item in overlap and so on. Resistance may be mitigated by adding music and images as well.

An attraction reduction unit 115 is included in the route-exterior area adjustment unit 112 above and reduces attraction in the area exterior to the route by referencing the attraction list, managed by the attraction list management unit 117. In order to reduce attraction, the user's perception may be interfered with, and the user caused to misunderstand by for example hiding existing attractors in the HMD and the like, displaying another item in overlap and so on. Attraction may be mitigated by adding music and images as well.

A resistance augmentation unit 116 is included in the route-exterior area adjustment unit 112 above and augments resistance in the area external to the route by referencing the resistance list, managed by the resistance list management unit 118. In order to augment resistance, resistance phenomena may be realized in reality in such ways as conducting an uncomfortable air flow on one half of the body; images of attractors which are not present may be shown in the HMD, and resistors which are present may be emphasized by for example displaying the area around actual attractors in outline in a see-through HMD.

Note that each unit of FIG. 2 and FIG. 3 may be implemented in to one computer or distributed among a plurality of computers. For example, each unit of FIG. 3 may be included in one HMD, the recognition unit 102 may be included in another device, and the management unit 104 may be included in a server device on the Internet. Also, each unit in FIG. 2 and FIG. 3 may be a plurality of units, for example there are two recognition units 102 and so on, and a plurality of users may share each unit in FIG. 2 and FIG. 3.

Next, operations will be described.

Figure 4:
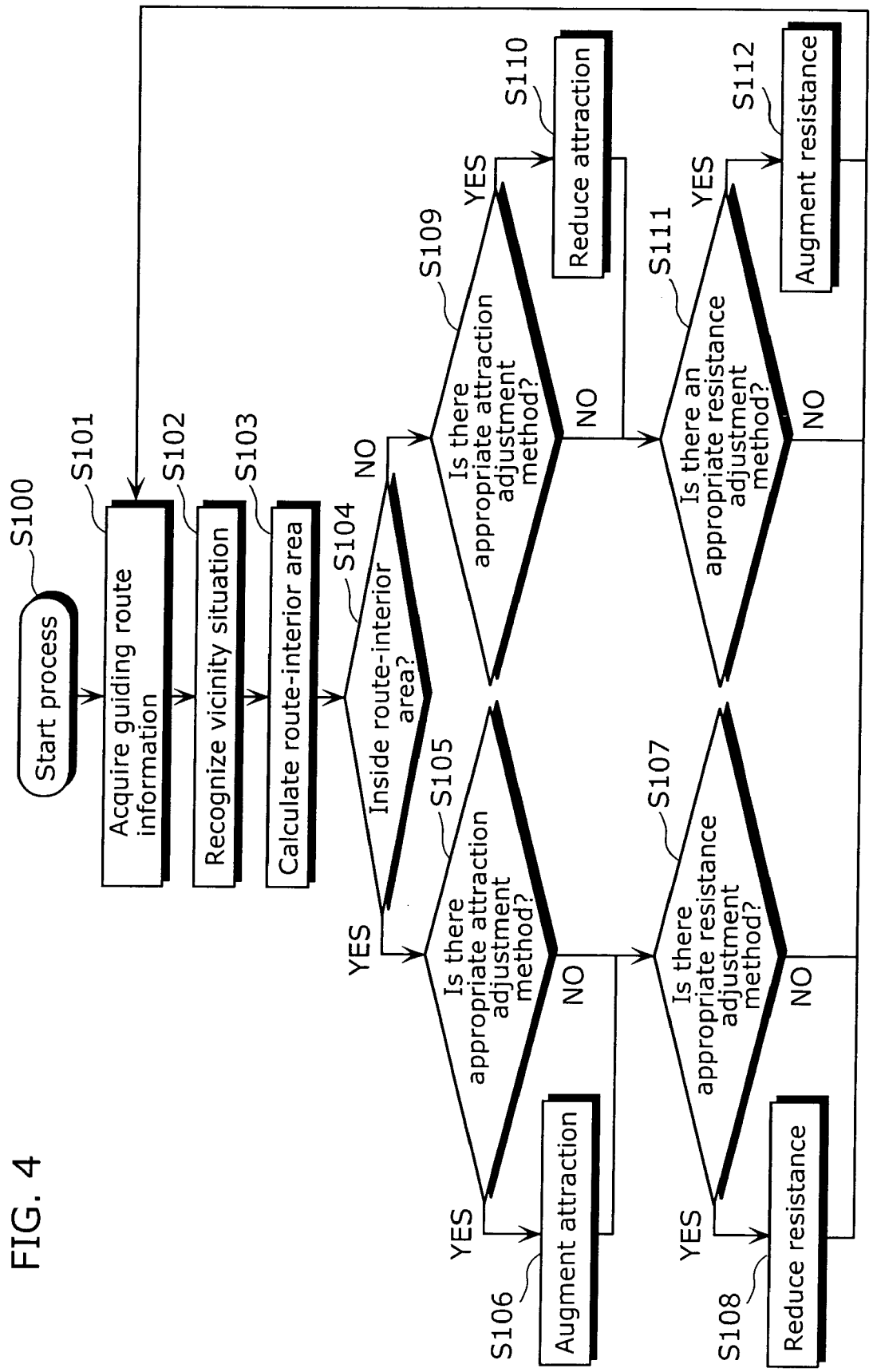
FIG. 4 is a flowchart that shows the operations of the guiding device in the first embodiment of the present invention.
Figure 5:
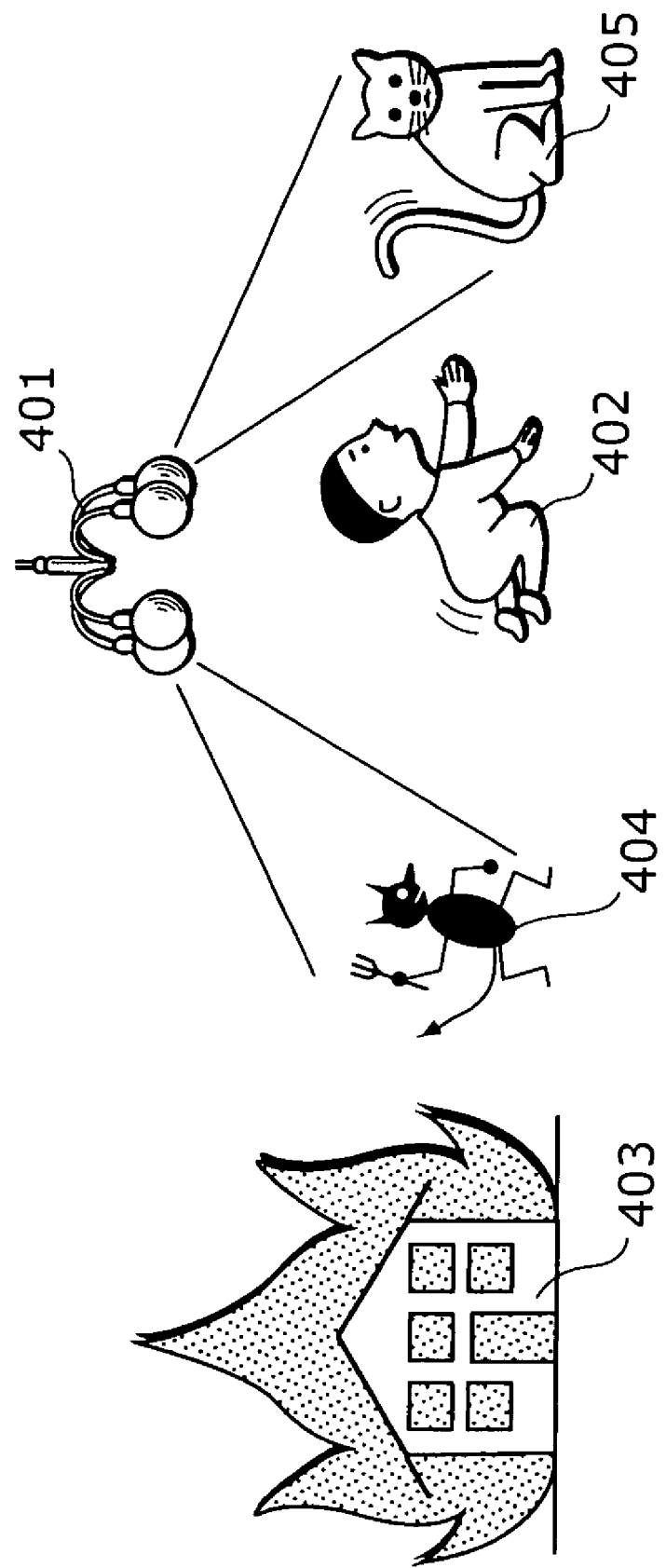
FIG. 5 is a diagram that shows an example scene of the guiding device's operations.

FIG. 4 is a flowchart that shows the operations of the guiding device in the first embodiment of the present invention, and FIG. 5 is a diagram that shows an example scene of the guiding device's operations. Here the projector-installed lighting apparatus 401, which serves as a guiding device, is illustrated, and the case where the lighting apparatus 401 helps an infant 402, left at home, evacuate from a neighboring home fire 403 is described. Note that as above, the recognition unit 102 is set to recognize the outbreak of the neighboring home fire 403 (a trigger).

First, the acquisition unit 101 acquires the guiding route information (S100→S101). Here, the evacuation guiding route from the room where the infant is to the house's exit, is the guiding route. There are various methods for calculating the guiding route and there is not one method in particular. For example, the parent of the infant which is in a remote location sees a floor plan of the house and the infant's present position displayed in the LCD screen of a mobile terminal, and by manipulating the arrow button on a cellular phone, may designate a guiding route from the infant's present location to the house's exit. Or, a system which calculates the guiding route may calculate the guiding route automatically, using the floor plan of the house, the present position of the infant and a database in which a plurality of guiding route plans are managed.

FIG. 6 is a diagram which shows an example of a guiding route in the first embodiment of the present invention, depicting a view from above, of the house where the infant is and the burning neighboring house. 406 is a guiding route which the acquisition unit 101 has acquired.

The recognition unit 102 recognizes the infant's vicinity situation (S102). Here, the positional relationship between the infant 402, a wall face 404 and a wall face 405, the action condition that "the infant is not engaged in any activity", and so on are recognized.

The judgment unit 103 calculates the route area based on the guiding route information acquired by the acquisition unit 101 (S103). This route area is, as mentioned above, a guiding route prescribed by area. Because there is a need to differentiate between the interior and exterior region in the below descriptions, the route area is set as the "route-interior area", and areas outside of the route area are set as the "route-exterior area". FIG. 7 is a diagram which shows an example of the route-interior area in the first embodiment of the present invention; the area shown by the lattice pattern is the route-interior area 407, and the area outside of this pattern is the route-exterior area.

The judgment unit 103 judges whether or not an object recognized by the recognition unit 102 exists within the route-interior area (S104). For example, in the case where the wall face 404 and the wall face 405 are recognized by the recognition unit 102, the wall face 404 is judged not to exist within the route-interior area 407, and the wall face 405 is judged to exist within the route-interior area 407.

Below, a process for an object which exists within the route-interior area 407 is described.

The route-interior area adjustment unit 111 judges whether or not there is an appropriate attraction adjustment method by referencing the attraction list, managed by the attraction list management unit 117 (S105).

FIG. 8 is a diagram which shows an example of the attraction list in the first embodiment of the present invention. As shown in this attraction list L1, the "real cat" augments the infant's attraction and thus, using the real cat as an adjustment method for the route-interior area is appropriate. However, "a cat is present" must be set as the adjustment condition, and since the situation where "a cat is not present in the house" is ascertained by the recognition unit 102, this adjustment method cannot be utilized. On the other hand, since the "cat image 1" augments the infant's attraction, it is appropriate to utilize the cat image 1 as a method for adjusting the route-interior area. Since the adjustment condition "an image may be projected onto a visible wall" can be fulfilled by projecting an image from the projector-installed lighting apparatus 401 onto the wall face 405, this adjustment method is judged to be an appropriate adjustment method. Note that although not mentioned in FIG. 8, under a situation in which the adjustment condition "a toy may be activated" is fulfilled, the infant's attraction may be augmented by activating the toy.

The attraction augmentation unit 113 augments the attraction of the infant by an adjustment method judged to be appropriate by the route-interior area adjustment unit 111 (S106). Specifically, the projector-installed lighting apparatus 401 projects an image like the "cat image 1" of FIG. 8, onto the wall face 405. By doing so, the infant's attraction towards the wall face 405 increases in comparison to a wall which is not projected upon.

The route-interior area adjustment unit 111 judges whether or not there is an appropriate resistance adjustment method by referencing the resistance list managed by the resistance list management unit 118 (S107).

FIG. 9 is a diagram which shows an example of the resistance list in the first embodiment of the present invention. As shown in this resistance list L2, since a "real dog" augments the infant's resistance, using a real dog as a method for adjusting the route-interior area is inappropriate, in the same way, an "image of a devil" is also inappropriate. On the other hand, since an "image of a child playing with a dog" decreases the infant's resistance, using the image of a child playing with a dog as a method for adjusting the route-interior area is appropriate. However, "a dog is present, and thus an image may be projected onto a wall near the dog" must be the adjustment condition, and here, since the situation where "a dog is not present in the vicinity" is ascertained by the recognition unit 102, this adjustment method cannot be utilized.

The resistance reduction unit 114 reduces the resistance of the infant by an adjustment method judged to be appropriate by the route-interior area adjustment unit 111 (S108). Here, there is no adjustment method judged to be appropriate, and so no processes are performed.

Note that the "target" shown in the attraction list L1 and the resistance list L2 stands for an object which becomes a target for the adjustment. For example, when describing the attraction name "cat image 1", the object onto which the image of the cat is projected is a "wall", and when describing the attraction name "cat's hiss", the object which exists in the direction of the sound of the cat hissing is a "cat". Also, the "example" shown in the attraction list L1 and the resistance list L2 is an example of the adjustment method. Here, for ease of comprehension of the invention these examples are expressed in simple drawings and text, however it is actually best to record the location of the program for executing the adjustment process, and so on. In this way, the attraction list L1 and the resistance list L2 are managed by associating the object with the adjustment method.

Next, processes for an object which does not exist in the route-interior area 407 are described.

The route-exterior area adjustment unit 112 judges whether or not there is an appropriate adjustment method by referencing the attraction list L1, managed by the attraction list management unit 117 (S109).

As shown in the attraction list L1 in FIG. 8, since the "real cat" augments the infant's attraction, using a real cat as a method for adjusting the route-exterior area is inappropriate, and likewise the "image of a cat 1" is inappropriate. On the other hand, since the "cat's hiss" reduces the infant's attraction, "the cat's hiss" is appropriate. However, "audio reproduction may be performed so that the audio sounds as if it originates from the direction of a cat" must be the adjustment condition, and here, since the situation where "a cat is not present in the vicinity" is ascertained by the recognition unit 102, this adjustment method cannot be utilized.

The attraction reduction unit 115 reduces the infant's attraction by a method judged to be appropriate by the route-exterior area adjustment unit 112 (S110). Here there is no adjustment method judged to be appropriate, and so no processes are performed.

The route-exterior area adjustment unit 112 judges whether or not there is an appropriate adjustment method by referencing the resistance list L2, managed by the resistance list management unit 118 (S111).

As shown in the resistance list L2 in FIG. 9, since "real dog" augments the infant's resistance, using a real dog as a method for adjusting the route-exterior area is appropriate. However, "a big dog is present" must be the adjustment condition, and here, since the situation where "a dog is not present in the house" is ascertained by the recognition unit 102, this adjustment method cannot be utilized. On the other hand, since the "image of a devil" augments the infant's resistance, using the image of a devil as a method for adjusting the route-exterior area is appropriate. Also, since the adjustment condition that "an image may be projected on a visible wall" can be fulfilled by projecting an image from the projector-installed lighting apparatus 401 onto the wall face 404, it is judged that this adjustment method is an appropriate adjustment method.

The resistance augmentation unit 116 augments the infant's resistance by an adjustment method judged to be appropriate by the route-exterior area adjustment unit 112 (S112). More specifically, the projector-installed lighting apparatus 401 projects an image like the "image of a devil" shown in FIG. 9 onto the wall face 404. By doing so, the infant's resistance towards the wall face 404 augments in comparison to a wall which is not projected upon.

As above and according to the present invention, as a result of the augmentation of attraction and the decrease of resistance to the area inside the guiding route, and the decrease of attraction and the augmentation of resistance to the area outside the guiding route, it becomes possible to induce a user to move according to the guiding route.

Note that either the operation at S101 or the operation at S102 shown in FIG. 4 may be performed first. It is best if the operations at S101 and S102 conclude before the operation at S103. Also, any of the operations at S105, S107, S109 and S111 may be performed first. In the same way, any of the operations at S106, S108, S110 and S112 may be performed first. Further, each operation shown in FIG. 4 may be carried out immediately one right after the other or may be carried out at length or in parallel.

Note that the present invention is not limited to the S104 shown in FIG. 4, in which the judgment unit 103 recognizes whether or not an object recognized by the recognition unit 102 exists within the route-interior area. In other words, the judgment unit 103 may be set to judge to what extent the object above is within the area. By doing so, it is possible to perform a variety of controls such as increasing the user's attraction to the extent that an object is nearer the center of the route-interior area, even if several objects are present in the same route-interior area. Judgment according to probability may also be performed in such ways as "there is a 50% probability that the object exists in route-interior area".

Note that the adjustment conditions of the attraction list and the resistance list are not limited to the presence or absence of phenomena such as "whether a cat is present", of objects in the vicinity or situations in the vicinity such as "a station", of devices such as an HMD or device use situations, nor of functions such as "an image can be projected". That is to say, the time leeway for the user being guided may be an adjustment condition. For example, in the case where there is no time margin, an adjustment method which takes immediate effect will be chosen, and in the case where there is a time margin, it is ideal that an adjustment method with a low load on the user's mental state be chosen. An effect that has been implemented in the past on a user or another person may also be an adjustment condition. For example, in the case where guidance has succeeded in the past at an 80% probability with the image of a cat, and guidance succeeds in the past with a 30% probability with the image of a dog, preferably the more effective cat with the higher probability, will be chosen as the most appropriate means. Also, without limiting determinate conditions, an adjustment method that will likely be appropriate may be predicted or inferred.

Note that in the description above, a situation in which information is set in advance in the attraction list and the resistance list were anticipated and described, however the present invention is not limited to this description. In other words, the user may update the content of the list by hand or the content of the list may be updated automatically by the device. In order to set the device to automatically update the contents, it is preferable to include a history accumulation unit which accumulates the user's action history.

Figure 10:
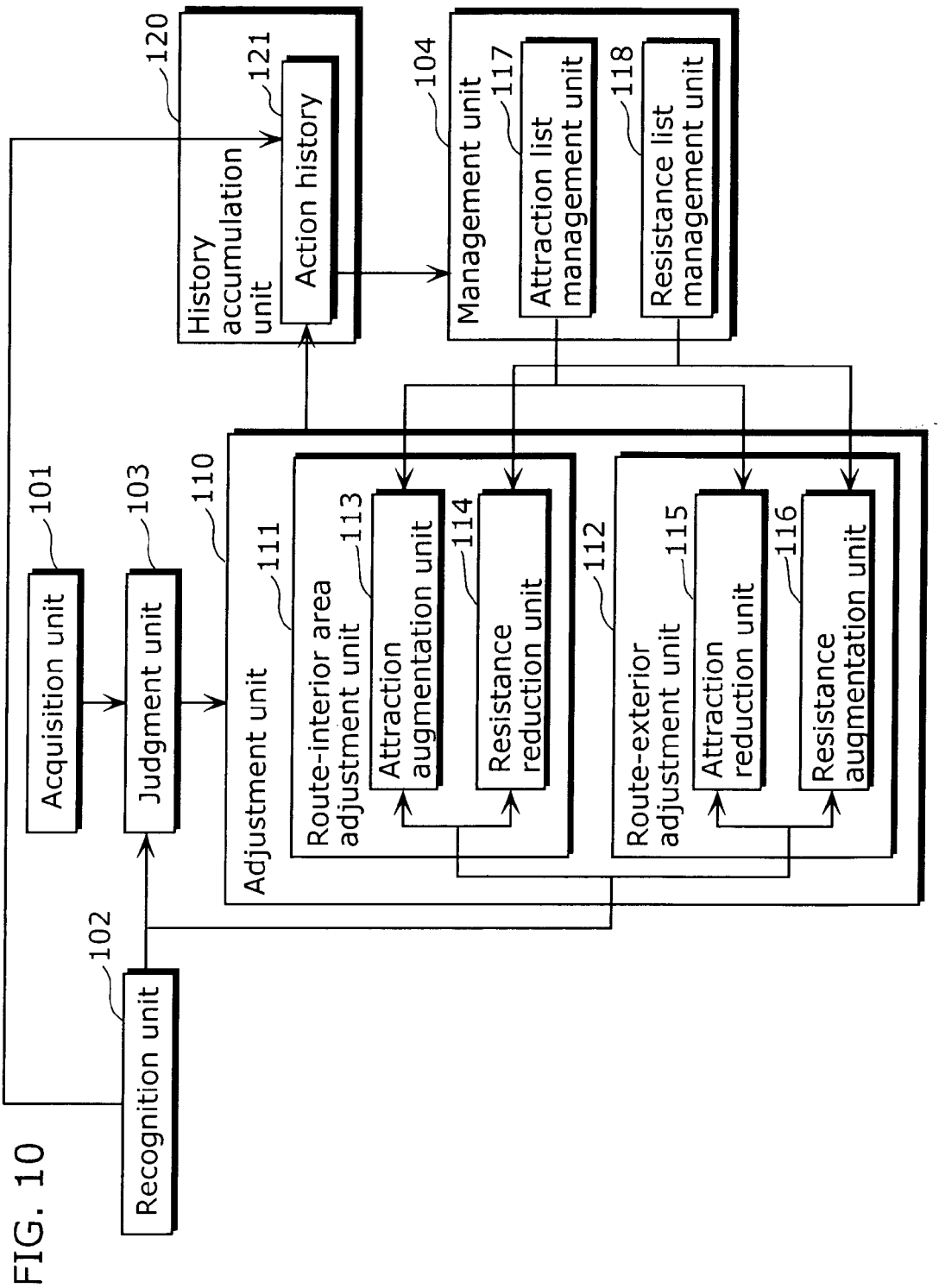
FIG. 10 is a schematic functional block diagram of another example of a guiding device in the first embodiment of the present invention.

FIG. 10 is a diagram which shows a structure which includes a history accumulation unit 120, which accumulates the user's action history 121. The recognition unit 102 recognizes the user's action and passes the recognition results to the history accumulation unit 120. The history accumulation unit 120 accumulates these recognition results as the user's action history 121. The management unit 104 updates the contents of the attraction list or the resistance list based on the user's action history 121.

FIG. 11 is a diagram which shows the user's action history 121. Here, a case is anticipated where talent list is presented to the user, and the user is asked whether the image should be played. When the list is presented to the user, the number of presentations of the talent included in the list is counted up. When the user selects the talent desired from the list, the number of selections for that talent is counted up. When the reproduction of the image of the talent selected is interrupted during reproduction, the number of interruptions for that talent is counted up. Note that when the list is presented to the user, the adjustment unit 110 is set to notify the history accumulation unit 120 of the presentation of the list to the user.

Here, the number of presentations for the talent "AA Hanako" is 10, the number of selections is 9, and since it is known that the user has a strong interest in AA Hanako, the attraction name "image of AA Hanako" is added to the attraction list. Meanwhile, the number of presentations for the talent "BB Tarou" is 10, the number of selections is 0, and since it is known that the user has no interest at all in BB Tarou, the resistance name "image of BB Tarou" is added to the resistance list.

Of course, the number of presentations for the talent "CC Jirou" is 7, the number of selections is 1, and since it is known that the user has little interest in CC Jirou, the attraction name "image of CC Jirou" may be added to the attraction list. Also, the number of presentations for the talent "DD Saburou" is 3, the number of selections is 1, however, the number of interruptions is 1. In this case, since it is likely that the user has no interest at all in DD Saburou, the resistance name "image of DD Saburou" may be added to the resistance list.

FIG. 12 is a diagram which shows an example of the attraction list L1 after the attraction name "AA Hanako" has been added. The adjustment orientation is set to "augment attraction" since the user has an interest in AA Hanako. The target is a "wall" for projecting an image of AA Hanako. The adjustment condition is set to "may project on a visible wall" since the user's attraction cannot be augmented when the wall is not visible from the user.

FIG. 13 is a diagram which shows an example of the resistance list L2 after the attraction name "image of BB Tarou" has been added. The adjustment orientation is set to "augment resistance" since the user has no interest at all in BB Tarou. The target is a "wall" for projecting an image of BB Tarou. The adjustment condition is set to "may project on a visible wall" since the user's attraction cannot be augmented when the wall is not visible from the user.

Figures 14, 15:
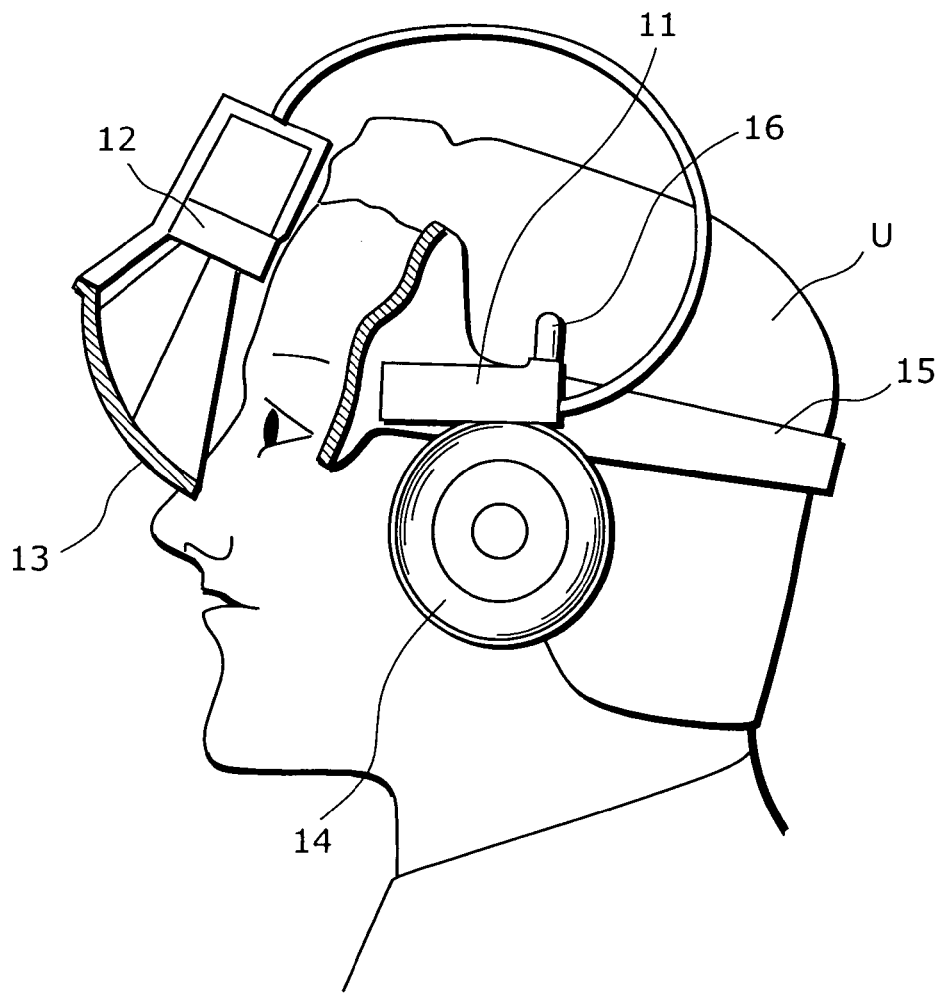
FIG. 14 is a diagram which shows the user's action history in the first embodiment of the present invention.
FIG. 15 is a schematic outline drawing of the guiding device in the second embodiment of the present invention.

FIG. 14 is a diagram which shows another example of the user's action history 121. Here, a case is anticipated in which an animal appears in the vicinity of the user. When an animal appears in the vicinity of the user, the number of appearances of that animal is counted up. When the user approaches an animal that has appeared, the number of approaches for that animal is counted up. When the user takes action to avoid an animal in times such as when the animal has appeared or when the user has approached the animal, the number of evasions for that animal is counted up. Note that it is possible to utilize means for shooting an image of an animal, and for analyzing that image as a means for judging the type of the animal. The recognition unit 102 is set to recognize the appearance of an animal, the approach of a user towards that animal as well as the user's evasion of an animal. The device may also be set to count the number of times that a user has touched an animal, instead of the number of times the user has approached the animal.

Here, the number of appearances for the animal "sparrow" is 5, the number of approaches is 5, and since it is known that the user has a strong interest in the sparrow, the attraction name "sparrow call" is added to the attraction list. Meanwhile, the number of appearances for the animal "frog" is 3, the number of approaches is 0 and since it is known that the user has no interest at all in the frog, the resistance name "frog sound" is added to the resistance list.

Of course, the number of appearances for the animal "rabbit" is 7, the number of approaches is 1 and since the user has some interest in the rabbit, the attraction name "image of rabbit" may be added to the attraction list. Likewise, the number of appearances for the animal "cockroach" is 4, the number of appearances is 3, however the number of evasions is 1. In this case, since it is likely that the user has no interest at all in the cockroach, the resistance name "image of cockroach" may be added to the resistance list.

FIG. 12 is a diagram which shows an example of the attraction list L1 after the attraction name "sparrow call" is added. The adjustment orientation is set to "augment attraction" since the user has a strong interest in the sparrow. The target is the "sparrow" which is present in the user's vicinity. The adjustment condition is set to "audio reproduction may be performed so that the audio sounds as if it originates from the direction of a sparrow" since when the user does not perceive the sparrow, the user's attraction cannot be augmented.

FIG. 13 is a diagram which shows an example of the resistance list L2 after the attraction name "frog sound" has been added. The adjustment orientation is set to "augment resistance" since the user has no interest at all in the frog. The target is a "frog" which is present in the user's vicinity. The adjustment condition is set to "audio reproduction may be performed so that the audio sounds as if it originates from the direction of a frog" since the user's resistance cannot be augmented when he/she does not perceive the existence of the frog.

In this way, it is possible to update the content of the attraction list or the resistance list based on the user's action history according to the present invention. That is to say, since the content of the attraction list or the resistance list can be updated to content that corresponds to the preferences of the user, it is possible to improve the probability that the guidance will succeed.

Note that the methods for acquiring information necessary when executing an adjustment process such as the image of a talent or the sound of an animal are not limited to one particular method. For example, when the user is asked whether or not the image must be reproduced by presenting the talent list to the user, it must be possible to acquire the image of a talent from a recording medium and so on. Accordingly, in this kind of case, the image of a talent may be acquired from a recording medium and so on when the user is asked whether or not the image should be reproduced. The sound of an animal may also be preserved in the device in advance, or downloaded from the Internet, and so on.

Note that here when audio is reproduced so that it sounds as if it originates from the direction of the sparrow, the attraction of the user increases, however conversely, in the case where a sparrow present outside of the guiding route is calling, the user's attraction may be reduced by preventing the audibility of the call from the direction of the sparrow. The phrase "preventing the audibility of the call from the direction of the sparrow" includes making the call audible from another direction (here, the direction of the guiding route) as well as making the call completely inaudible.

Note that in the case where the adjustment unit 110 has made an adjustment, the user's reaction to the adjustment is acquired and may be reflected in the attraction list or the resistance list. In other words, there is a column established in the list which establishes the effects of actions to be taken and in the case where the guidance succeeds, the value which expresses the effect of the actions to be taken is increased, and conversely in the case where guidance fails, the device may be set to reduce the value which expresses the result of the actions to be taken.

Second Embodiment

In the first embodiment, a lighting apparatus with a projector installed served as an example of a guiding device, and a scene was described in which this lighting apparatus guides an infant in a room. In the present second embodiment, a see-through Head Mounted Display (HMD) serves as an example of a guiding device and a scene is described in which this see-through HMD guides a moving user through a train station. Note that here, a see-through HMD serves as an example and is described, however another type of HMD may also be utilized such as a face-mounted display, a microscope model display, a transparent-model display or a retina-scan model display.

FIG. 15 is a schematic outline drawing of the guiding device in the second embodiment of the present invention. This see-through HMD is an information presentation device in a shape such as goggles or a helmet, and includes a calculator 11 which performs various kinds of control in order to present information to the user, a display device 12 such as a Liquid Crystal Display (LCD), an optical element (presentation screen) 13 placed in front of the user's eyes, headphones for audio guidance 14, a fitting component 15 for fitting the HMD to a user U's head and a receiver 16 for receiving presented information from the Internet and so on. One surface of the optical element 13 is a concave, non-spherical face, to which a half-mirror coating is applied, and which forms a virtual image reflecting the information displayed on the display device 12. The other surface of the optical element 13 is a convex, non-spherical face, and since the user can see the outside world, the user observes the information displayed on the display unit 12 in overlap with the outside world.

The functional block diagram of the guiding device in the second embodiment of the present invention is the same as that of the first embodiment.

Figure 16:
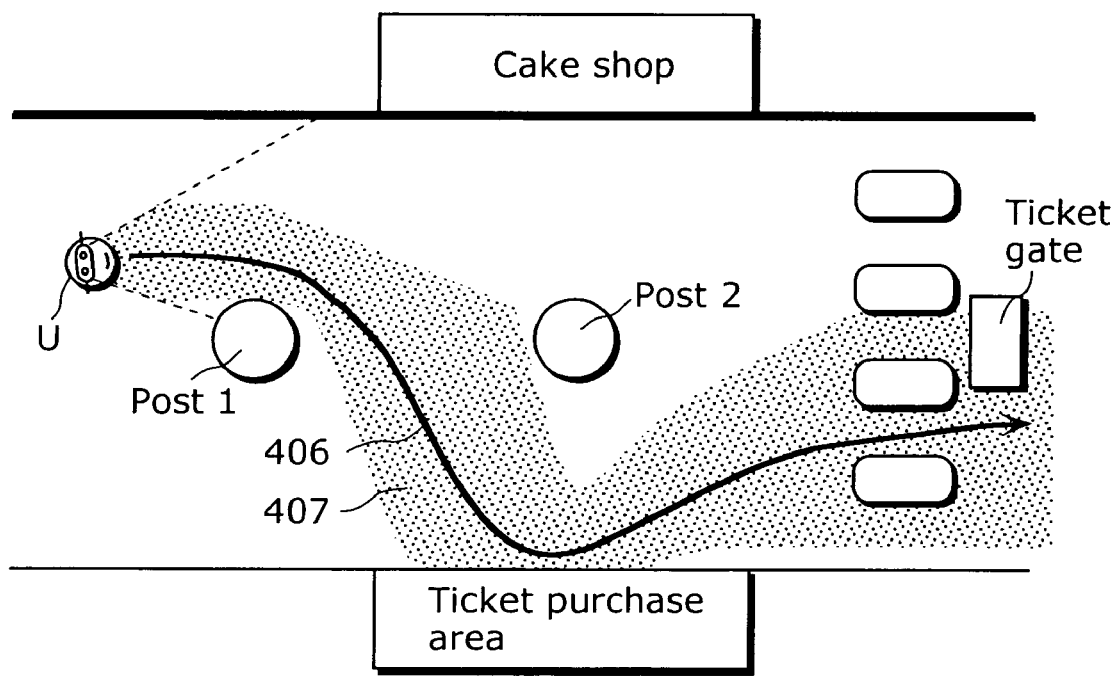
FIG. 16 is a diagram which shows an example of guiding in the second embodiment of the present invention.

FIG. 16 is a diagram which shows an example of guiding in the second embodiment of the present invention. This FIG. 16 is a diagram which depicts the ticket gate area in the station viewed from above, and a state in which the user U fitted with the HMD is on the left and on the right, there is a ticket gate. From the perspective of the user U who faces the ticket gate, there is a cake shop on the left side (in FIG. 16, on the upper side), there is a ticket purchase area on the right side, and in front of him/her there are two posts.

Here, a situation is anticipated in which before the user U passes through the station's ticket gate, the user needs to buy a ticket at the ticket purchase area. In other words, an operation is shown in which the device guides the user U to the ticket purchase area in such a way that the user is not distracted by the cake shop to his/her left anterior and does not lose sight of the ticket purchase area to his/her right anterior.

Below, using the flowchart in FIG. 4, the operations of the guiding device in the second embodiment are described. Note that detailed descriptions are omitted for operations that are the same as in the first embodiment.

The acquisition unit 101 acquires the guiding route information (S100→S101). Here, the route from the user U's present position to the ticket gate is the guiding route. There are various methods for calculating the guiding route and these methods are not limited to one method in particular. For example, the user shoots an image of the outside world that he/she observes, and this image may be forwarded to a mobile terminal of the user U's parent. If the device is set in this way, the parent of the user U, who is at a remote location, sees an image of the train station and the present position of the user U displayed in the LCD screen of a mobile terminal, and by manipulating the arrow button on a cellular phone, may designate a guiding route from the user U's present position to the ticket gate. Or, a system which calculates the guiding route may calculate the guiding route automatically using a map of the train station, the present position of the user U and a database in which a plurality of guiding route plans are managed. Here, since the user must buy a ticket, the guiding route runs through the ticket purchase area.

The recognition unit 102 recognizes the user's vicinity situation (S102). Here, the positional relationships between the user U and the cake shop, ticket sales area and the posts, the image of the view that the user U sees, and an action situation, such as the user U's walking course, are recognized.

Figure 17:
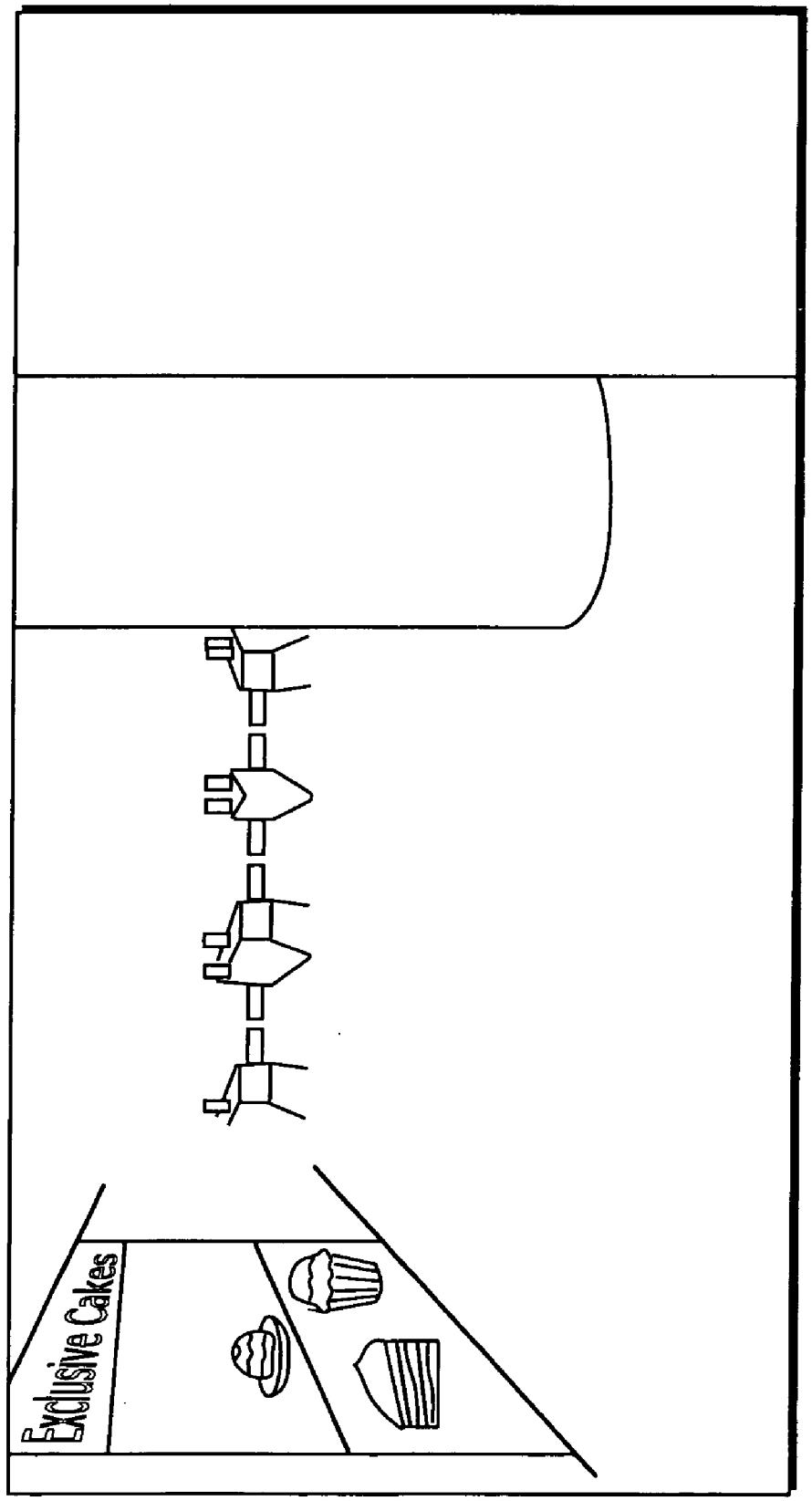
FIG. 17 is a diagram which shows an example of the view visible from the user in the second embodiment of the present invention.

FIG. 17 is a diagram which shows an example of the view visible from the user in the second embodiment of the present invention. A state is shown in which the ticket gate is visible ahead, the cake shop is visible to the left anterior and a post is visible on the right side.

The judgment unit 103 judges whether or not objects recognized by the recognition unit 102 are present within the route-interior area (S104), after calculating the route-interior area based on the guiding route information acquired by acquisition unit 101 (S103). For example, in the case where the cake shop and a post 1 and a post 2 are recognized by the recognition unit 102, the cake shop is judged to not exist within the route-interior area 407, and the space between the post 1 and the post 2 is judged to be the route-interior area 407.

The route-interior area adjustment unit 111 judges whether or not there is an appropriate attraction adjustment method by referencing an attraction list managed by the attraction list management unit 117 (S105).

FIG. 18 is a diagram which shows an example of the attraction list in the second embodiment of the present invention. As shown in this attraction list L3, a "real cake" augments the user U's attraction and thus, using the real cake as an adjustment method for the route-interior area is appropriate. However, "a cake is present" must be the adjustment condition, and since the situation where "a cake is not present within the route" is ascertained by the recognition unit 102, this adjustment method cannot be utilized. On the other hand, since the "cat image 2" augments the user U's attraction, it is appropriate to utilize the cat image as a method for adjusting the route-interior area. Since the adjustment condition "may be presented in a see-through HMD" may be fulfilled by the user being fitted with a see-through HMD, this adjustment method is judged to be an appropriate adjustment method.

Figure 19:
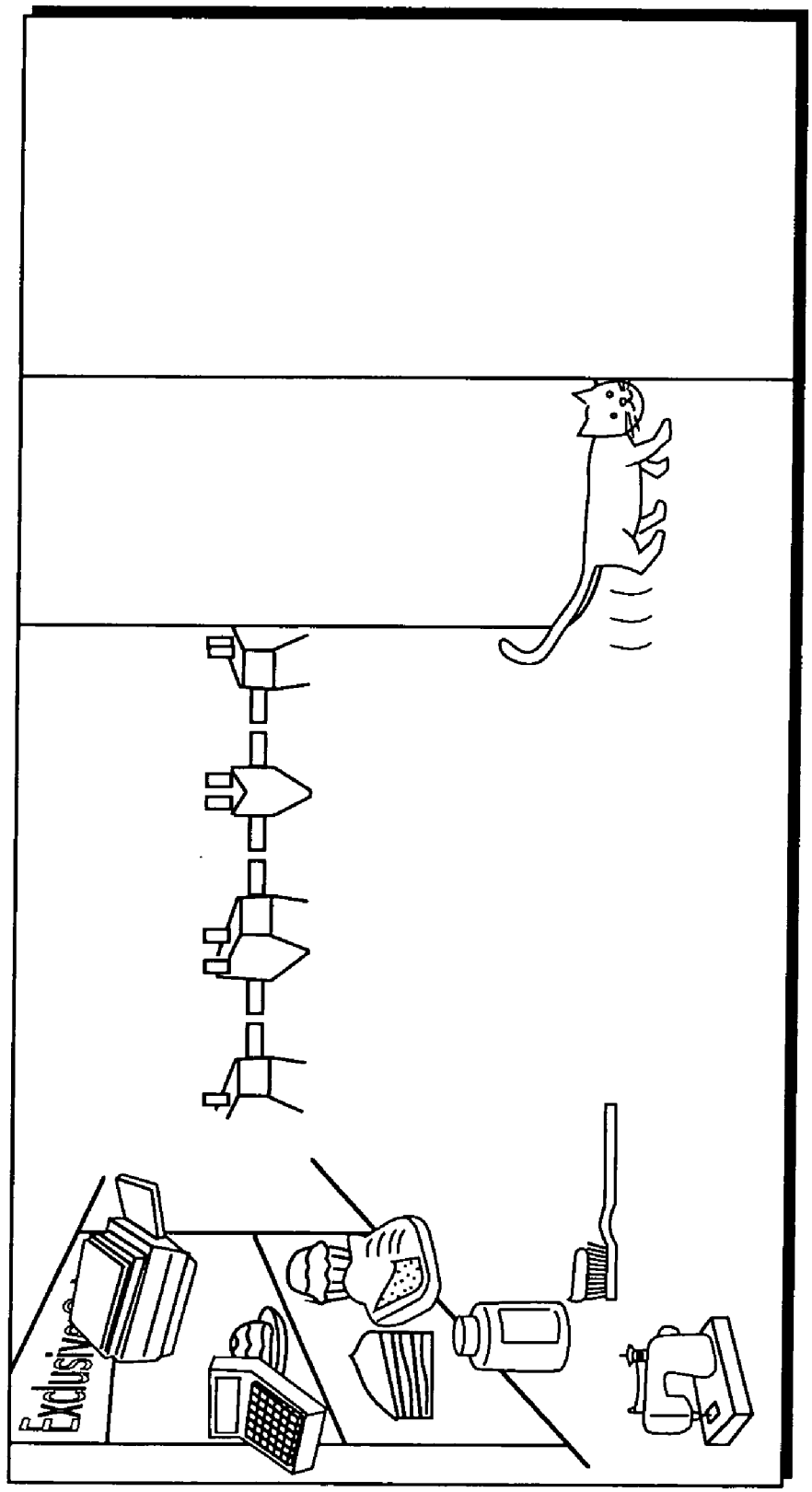
FIG. 19 is a diagram which shows an example of the view visible from the user in the second embodiment of the present invention.

The attraction augmentation unit 113 augments the attraction of the user U by an adjustment method judged to be appropriate by the route-interior area adjustment unit 111 (S106). FIG. 19 is a diagram which shows an example of the view visible from the user in the second embodiment of the present invention, and as shown in FIG. 19, the image of the cat between the posts is presented to the user U who is fitted with the HMD. By doing so, the user U's attraction to the area between the posts increases in comparison to a case where the image of a cat is not presented.

The route-interior area adjustment unit 111 judges whether or not there is an appropriate resistance adjustment method by referencing the resistance list, managed by the resistance list management unit 118 (S107). Here, the description is continued assuming that there is no appropriate resistance adjustment method.

The route-exterior area adjustment unit 112 judges whether or not there is an appropriate attraction adjustment method by referencing the attraction list, managed by the attraction list management unit 117 (S109).

As shown in the attraction list 2 in FIG. 18, since the "real cake" augments the user's attraction, using a real cake as a method for adjusting the route-exterior area is inappropriate, and likewise the "cat image 2" is inappropriate. On the other hand, a "collection of ordinary objects" is appropriate since it reduces the user U's attraction. Likewise, since there is an attractor in the route-exterior area which matches the "real cake" and the user is fitted with a see-through HMD, the adjustment condition "may be presented in a see-through HMD" may be fulfilled. Therefore, the adjustment method which utilizes the "collection of ordinary objects" is judged to be an appropriate means for attraction adjustment.

The attraction reduction unit 115 reduces the user U's attraction by a method judged to be appropriate by the route-exterior area adjustment unit 112 (S110). Specifically, as shown in FIG. 19, an image of the collection of ordinary objects is presented in the cake shop area to the user fitted with the HMD. By doing so, in comparison with the case where the image of the collection of ordinary objects is not presented, the user U's attraction to the cake shop decreases.

The route-exterior area adjustment unit 112 judges whether or not there is an appropriate resistance adjustment method by referencing the resistance list, managed by the resistance list management unit 118 (S111). Here the description is continued assuming that there is no appropriate resistance adjustment method.

Figure 20:
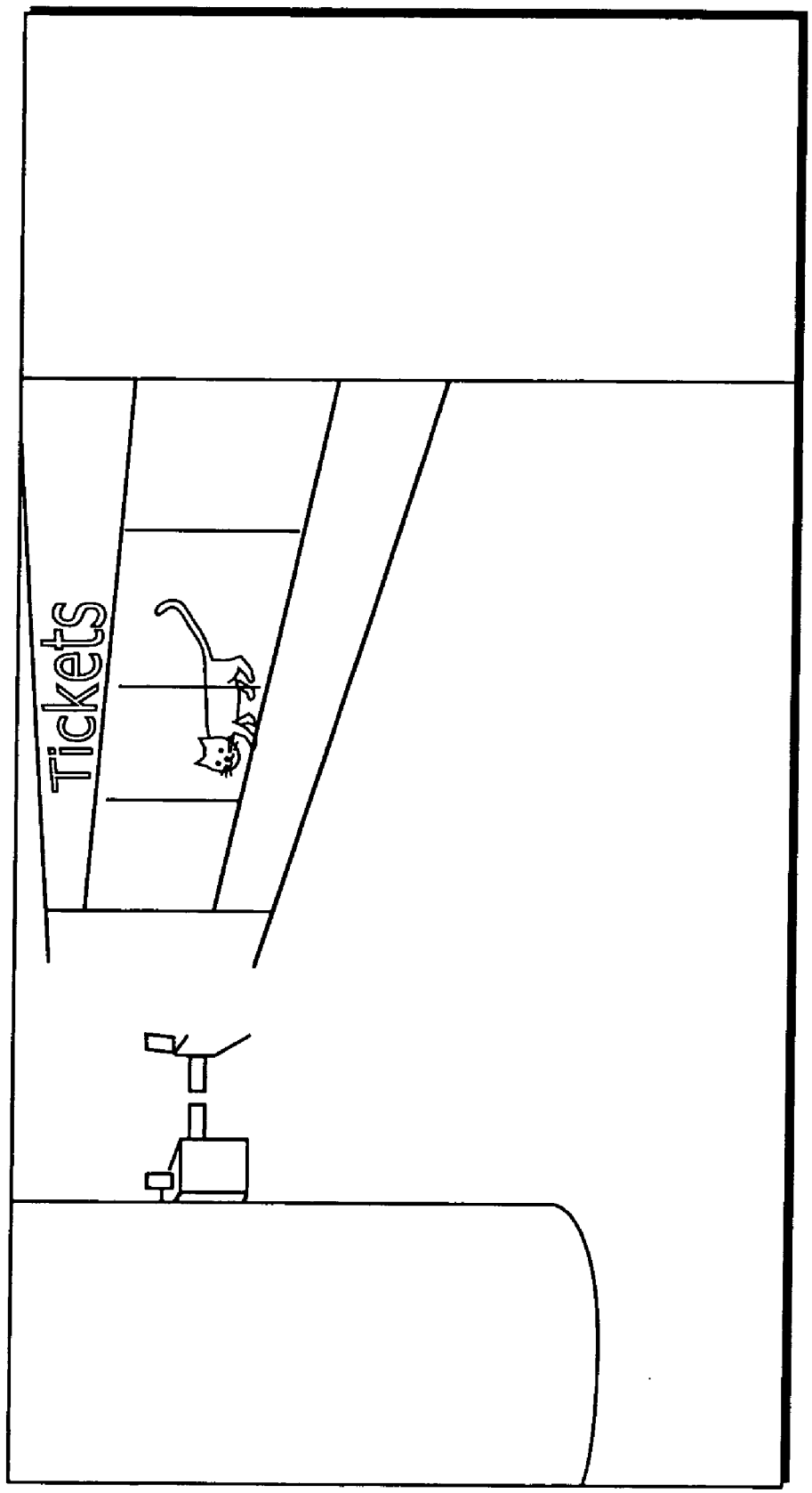
FIG. 20 is a diagram which shows an example of the view visible from the user in the second embodiment of the present invention.
Figure 21:
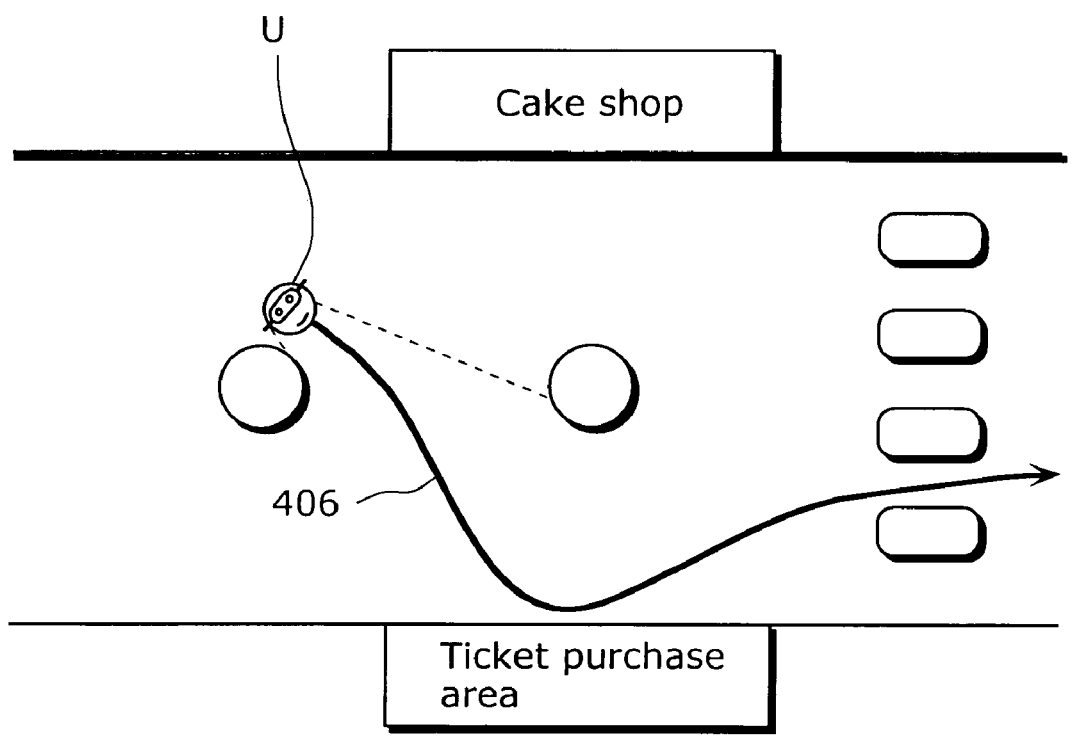
FIG. 21 is a diagram which shows an example of guiding in the second embodiment.

FIG. 20 is a diagram which shows an example of the view visible from the user in the second embodiment, and FIG. 21 shows an example of the guiding in the second embodiment. The user who saw the view in FIG. 19 has an interest in the image of the cat, so when the user looks at the area between the posts, the image of the cat is presented at the ticket purchase area in the area interior to the route, as shown in FIG. 20, and the displayed content is changed constantly according to the user's movement. This way, as shown in FIG. 21, the user U can be guided through the ticket purchase area, to the ticket gate.

As above and according to the present invention, as a result of the augmenting of attraction and the decreasing of resistance to the area inside the guiding route, as well as the decreasing of attraction and the augmentation of resistance to the area outside the guiding route, the user can be induced to move according to the guiding route.

Note that the above description concerns a device which guides a user chiefly using images, however the present invention is not limited to this description. In other words, since it becomes possible to induce the user to move according to the guiding route, configurations which guide the user using audio, text, smell and so on may be used.

Note that in the above description, the "cat image 2" was taken as an example of an image which guides the user, and the "collection of ordinary objects" was taken as an example of an image to which the user shows resistance, however the images mentioned here are not limited to images of objects. In other words, only images in colors that the user likes may be utilized as images to attract the user, and only images in colors that the user dislikes may be utilized as images to which the user shows resistance.

Figure 22:
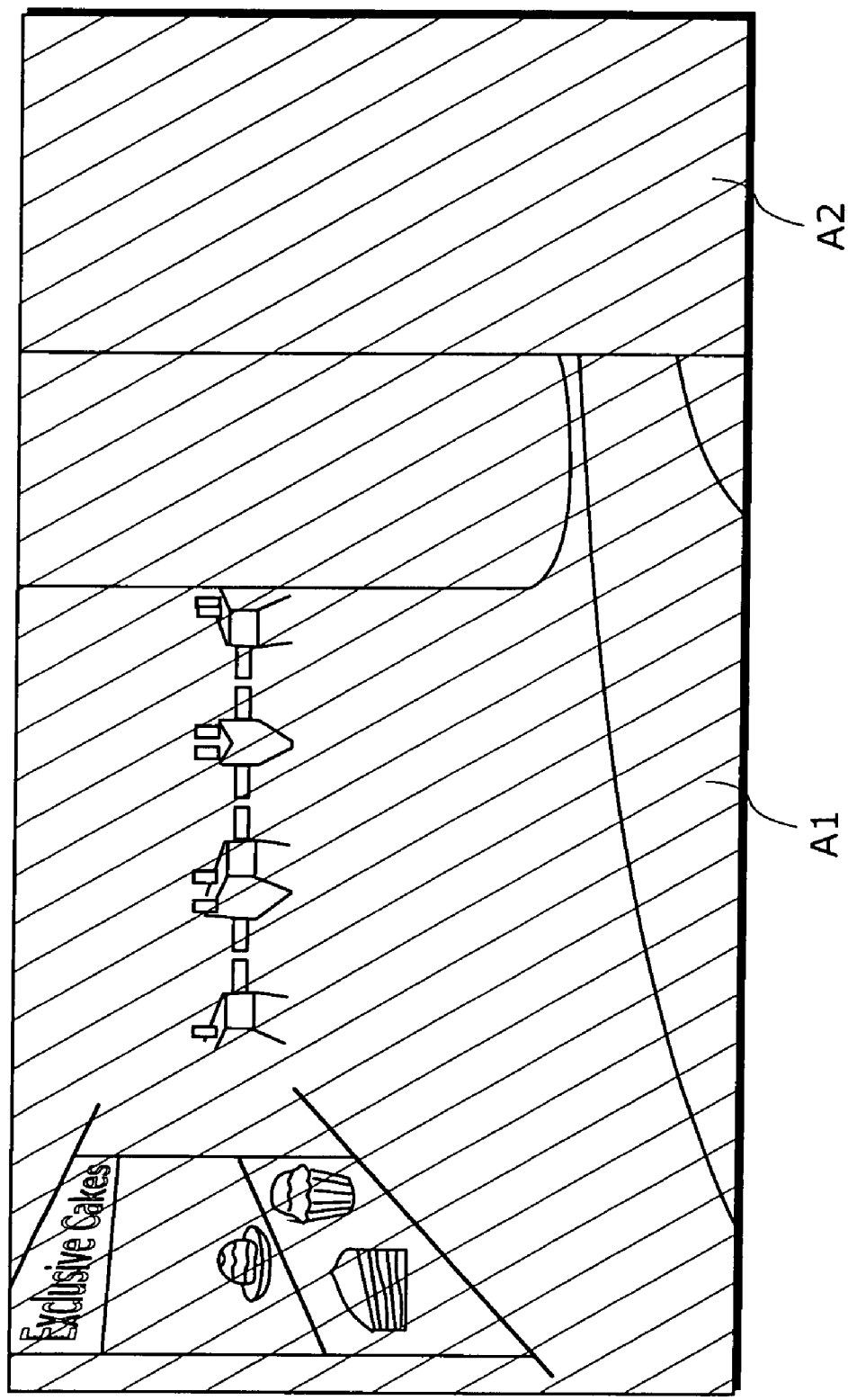
FIG. 22 is a diagram which shows another example of the view visible from the user in the second embodiment of the present invention.
Figure 23:
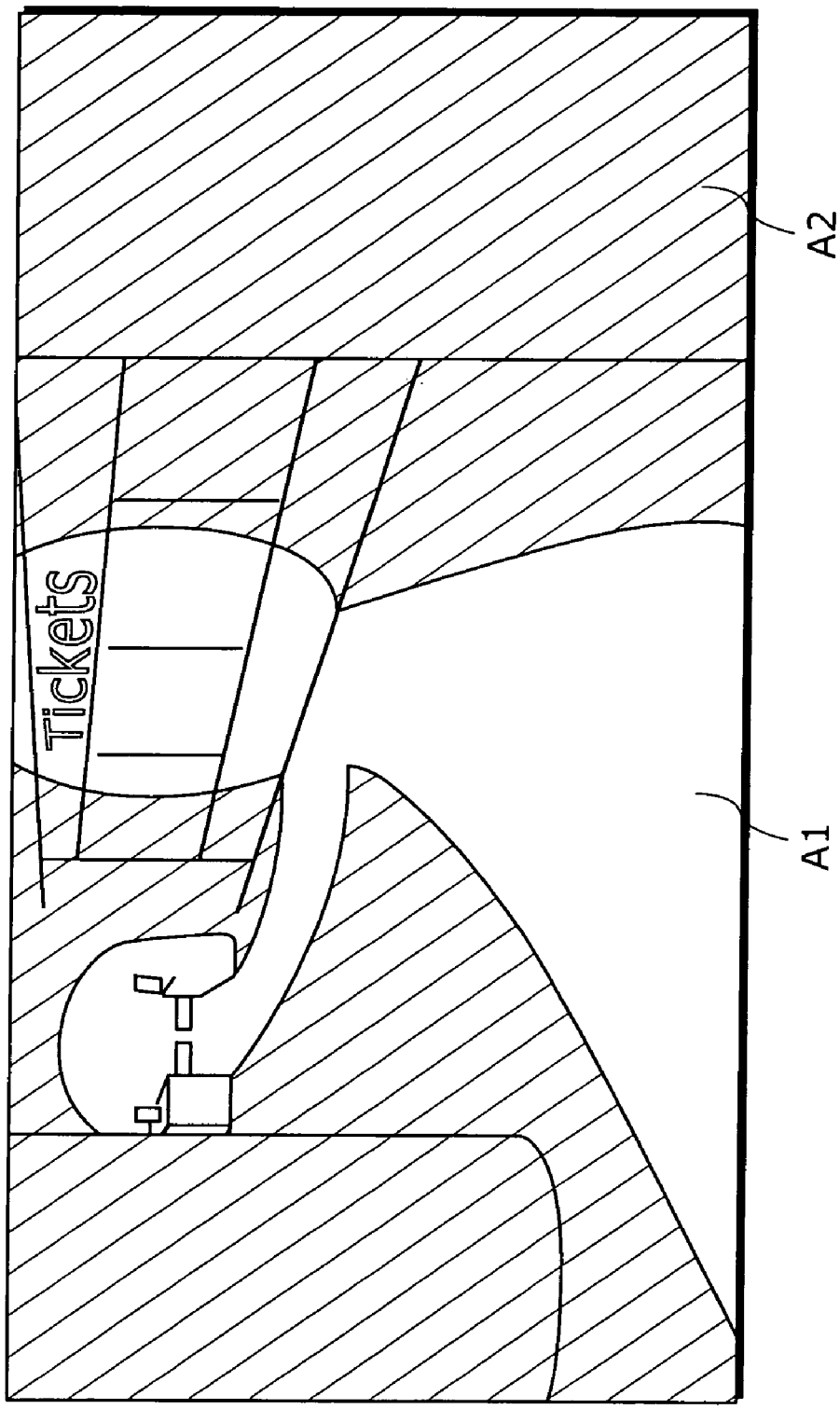
FIG. 23 is a diagram which shows another example of the view visible from the user in the second embodiment of the present invention.

FIG. 22 and FIG. 23 are diagrams which show other examples of the view visible from the user.

In FIG. 22, a state in which the ticket gate is visible ahead, a cake shop is visible to the left anterior and a post is visible on the right side is shown. Here, from among the views visible from the user, a blue image, which the user likes, is presented inside the route-interior portion A1 in which the posts are is included, and a red image, which the user dislikes, is presented inside the guiding route-exterior portion A2, in which the cake shop is included. In this way, the user is not attracted by the cake shop and moves between the posts.

In FIG. 23, a state is shown in which the ticket purchasing area is visible between the posts, and the ticket gate is visible beyond. Here, from among the views visible from the user, a blue image, which the user likes, is presented inside the guiding route-interior portion A1 in which the ticket purchase area and the ticket gate are included, and a red image, which the user dislikes, is presented inside the guiding route-exterior portion A2. In this way, the user moves through the ticket purchase area to the ticket gate.

Like so, even if images made up only of colors that the user likes are utilized as images to attract the user, and if images made up only of colors that the user dislikes are utilized as images to which the user shows resistance, the same effect as above may be obtained. Of course it is possible to use images made up only of patterns that the user likes and patterns that the user does not like. It is also effective to prevent the user from observing the region outside of the guiding route by decreasing the transparency of the color or pattern presented in the guiding route-exterior portion A2.

Figure 24:
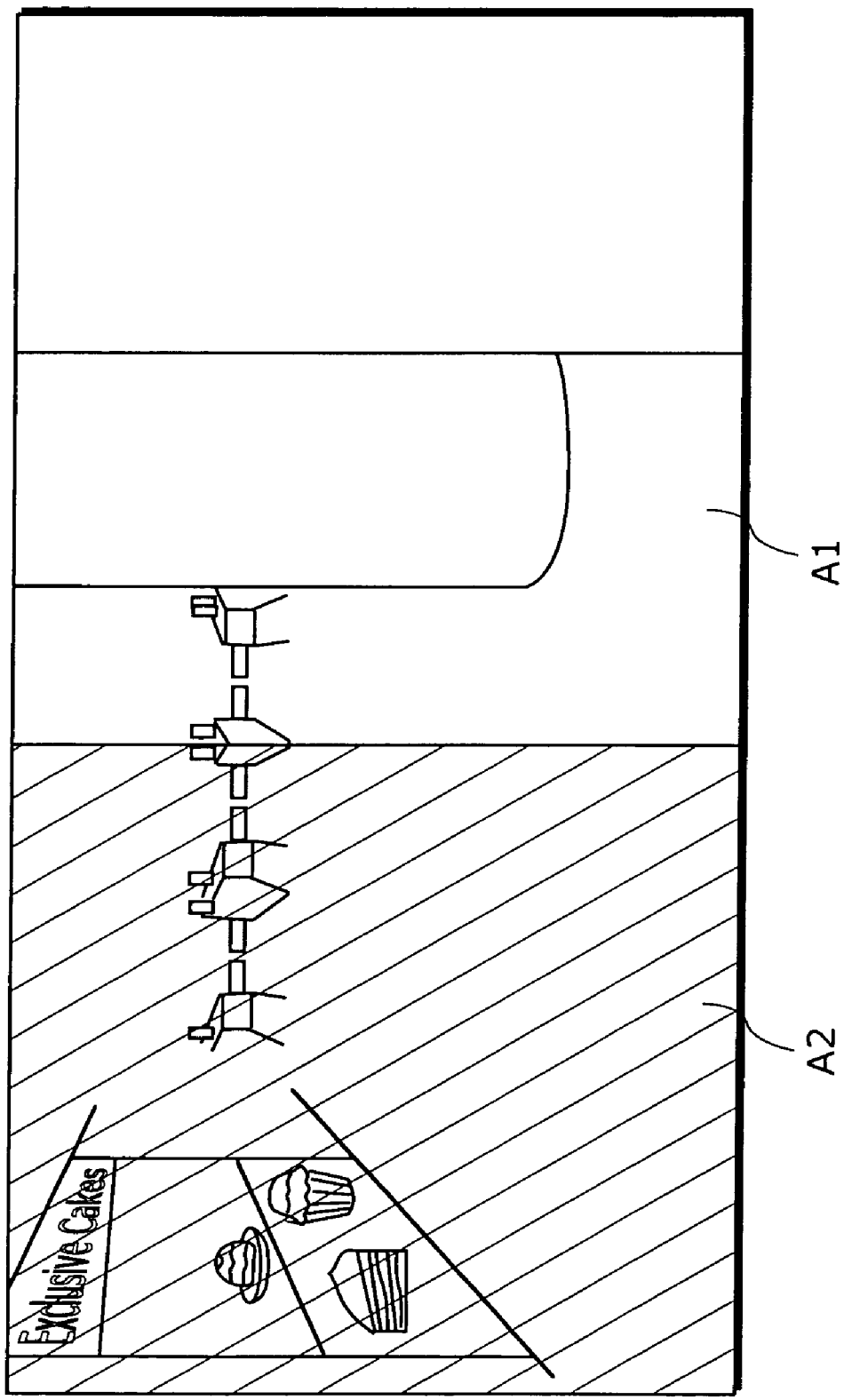
FIG. 24 is a diagram which shows another example of the view visible from the user in the second embodiment of the present invention.
Figure 25:
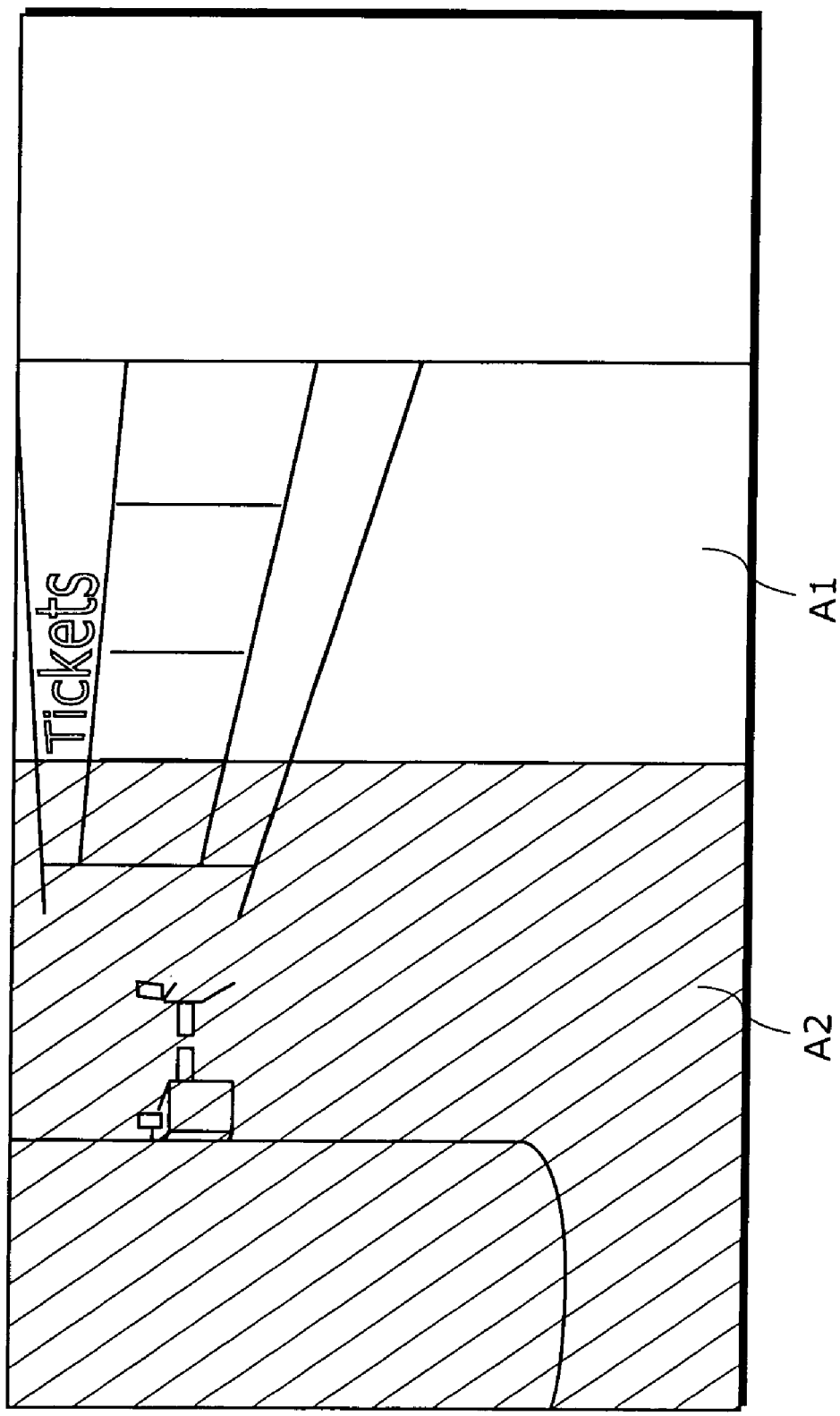
FIG. 25 is a diagram which shows another example of the view visible from the user in the second embodiment of the present invention.

Further, the colors may be changed according to the approximate guiding route. For example, as shown in FIG. 24 and FIG. 25, between the two areas divided into left and right, a blue image which the user likes is presented in the region A1 on the right side, through which the user must be moved, and a red image, which the user dislikes, is presented inside the guiding route-exterior portion A2. A judgment is made on whether the user should be moved left or right based on the guiding route. By an abbreviated means in which the user is guided through one of the two divided areas, the same effect as above may be obtained.

INDUSTRIAL APPLICABILITY

The guiding device according to the present invention can be applied to such uses as a projector or an HMD necessary for inducing a user to move according to a guiding route.

The invention claimed is:

1. A guiding device which guides a user, said guiding device comprising:
    an acquisition unit operable to acquire a guiding route for the user;
    a recognition unit operable to recognize an object which exists in the vicinity of the user;
    a management unit operable to manage an object and an adjustment method for adjusting an influence that the object has on an action of the user, by associating the object and the adjustment method in advance;
    a judgment unit operable to judge whether or not the object recognized by said recognition unit exists within the guiding route acquired by said acquisition unit; and
    an adjustment unit operable to adjust an extent to which the user shows resistance to the object based on a result obtained by said judgment unit, and on the adjustment method managed in association with the object recognized by said recognition unit.

2. The guiding device according to claim 1,
    wherein said adjustment unit is operable to augment an extent to which the object attracts the user, in the case where the object is judged to exist within the guiding route.

3. The guiding device according to claim 1,
    wherein said adjustment unit is operable to reduce an extent to which the user shows resistance to the object, in the case where the object is judged to exist within the guiding route.

4. The guiding device according to claim 1,
    wherein said adjustment unit is operable to reduce an extent to which the object attracts the user, in the case where the object is judged not to exist within the guiding route.

5. The guiding device according to claim 1,
    wherein said adjustment unit is operable to augment an extent to which the user shows resistance to the object, in the case where the object is judged to not exist within the guiding route.

6. The guiding device according to claim 1,
    wherein said adjustment unit is a head mounted display which is operable to present a specified image to the user by making the specified image overlap the object, or outlining an area around the object.

7. The guiding device according to claim 1,
    wherein said adjustment unit is a head mounted display operable to present a specified audio to the user so that the specified audio is audible from the direction of the object, or to prevent the specified audio from being audible from the direction of the object.

8. The guiding device according to claim 1,
    wherein said adjustment unit is a projector which is operable to project an image onto the object.

9. The guiding device according to claim 1,
    wherein said adjustment unit is an air-conditioning device operable to make the object conduct an air flow.

10. The guiding device according to claim 1,
    wherein said management unit is operable to manage one of an attraction list which is a collection of phenomena that influence an extent to which the user is attracted, and a resistance list which is a collection of phenomena which influence an extent to which the user shows resistance; and
    said adjustment unit is operable to cause a phenomenon included in one of the attraction list and the resistance list to occur.

11. The guiding device according to claim 10, further comprising
    a history accumulation unit operable to accumulate an action history of the user,
    wherein said management unit is operable to update contents of one of the attraction list and the resistance list to contents reflecting a preference of the user, based on the action history of the user accumulated in said history accumulation unit.

12. A guiding method of guiding a user, said guiding method comprising:
    an acquisition step of acquiring a guiding route for the user;
    a recognition step of recognizing an object which exists in the vicinity of the user;

an association step of associating in advance an object and an adjustment method for adjusting an influence that the object has on an action of the user;

a judgment step of judging whether or not the object recognized in said recognition step exists within the guiding route acquired in said acquisition step; and an adjustment step of adjusting an extent to which the user shows resistance to the object based on a result obtained in said judgment step, and on the adjustment method managed in association with the object recognized in said recognition step.

13. A computer-readable storage medium in which a program for guiding a user is stored, wherein the program causes a computer to execute a method comprising:

an acquisition step of acquiring a guiding route for the user;

a recognition step of recognizing an object which exists in the vicinity of the user;

an association step of associating in advance an object and an adjustment method for adjusting an influence that the object has on an action of the user;

a judgment step of judging whether or not the object recognized in said recognition step exists within the guiding route acquired in said acquisition step; and an adjustment step of adjusting an extent to which the user shows resistance to the object based on a result obtained in said judgment step, and on the adjustment method managed in association with the object recognized in said recognition unit.

14. An integrated circuit which guides a user, said integrated circuit comprising:

an acquisition unit operable to acquire a guiding route for the user;

a recognition unit operable to recognize an object which exists in the vicinity of the user;

a management unit operable to manage an object and an adjustment method for adjusting an influence that the object has on an action of the user, by associating the object and the adjustment method in advance;

a judgment unit operable to judge whether or not the object recognized by said recognition unit exists within the guiding route acquired by said acquisition unit; and an adjustment unit operable to adjust an extent to which the user shows resistance to the object based on a result obtained by said judgment unit, and on the adjustment method managed in association with the object recognized by said recognition unit.

* * * * *

UNITED STATES PATENT AND TRADEMARK OFFICE
CERTIFICATE OF CORRECTION

PATENT NO. : 7,664,598 B2
APPLICATION NO. : 10/593722
DATED : February 16, 2010
INVENTOR(S) : Kakuya Yamamoto et al.

It is certified that error appears in the above-identified patent and that said Letters Patent is hereby corrected as shown below:

In column 20, claim 13, line 5, "unit" should read --step--.

Signed and Sealed this

Fifteenth Day of June, 2010

David J. Kappos
*Director of the United States Patent and Trademark Office*